US009030581B2

(12) United States Patent
Kasai

(10) Patent No.: US 9,030,581 B2
(45) Date of Patent: May 12, 2015

(54) SOLID-STATE IMAGING DEVICE, IMAGING APPARATUS, ELECTRONIC APPLIANCE, AND METHOD OF DRIVING THE SOLID-STATE IMAGING DEVICE

(75) Inventor: Gen Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 13/410,900

(22) Filed: Mar. 2, 2012

(65) Prior Publication Data

US 2012/0235021 A1 Sep. 20, 2012

(30) Foreign Application Priority Data

Mar. 16, 2011 (JP) ................................. 2011-057724

(51) Int. Cl.
| | |
|---|---|
| H04N 9/64 | (2006.01) |
| H04N 5/335 | (2011.01) |
| H04N 3/14 | (2006.01) |
| H04N 5/355 | (2011.01) |
| H04N 5/359 | (2011.01) |
| H04N 5/374 | (2011.01) |
| H04N 5/378 | (2011.01) |

(52) U.S. Cl.
CPC ......... *H04N 5/35527* (2013.01); *H04N 5/3559* (2013.01); *H04N 5/359* (2013.01); *H04N 5/374* (2013.01); *H04N 5/378* (2013.01)

(58) Field of Classification Search
USPC ........................................................ 348/248
See application file for complete search history.

(56) References Cited

U.S. PATENT DOCUMENTS

| 2005/0083421 A1* | 4/2005 | Berezin et al. ................ 348/308 |
| 2007/0206106 A1* | 9/2007 | Kakumoto et al. ........... 348/308 |
| 2009/0101796 A1* | 4/2009 | Ladd et al. .................... 250/206 |
| 2009/0174799 A1* | 7/2009 | Lee et al. ...................... 348/294 |
| 2011/0013065 A1* | 1/2011 | Shinohara ..................... 348/302 |

FOREIGN PATENT DOCUMENTS

| JP | 2007-088972 A | 4/2007 |
| JP | 2007-151069 A | 6/2007 |
| JP | 2008-099158 | 4/2008 |
| JP | 2011-023590 A | 2/2011 |

OTHER PUBLICATIONS

Japanese Office Action issued Nov. 11, 2014 for corresponding Japanese Application No. 2011-057724.

* cited by examiner

*Primary Examiner* — Jason Flohre
(74) *Attorney, Agent, or Firm* — Fishman Stewart Yamaguchi PLLC

(57) ABSTRACT

A solid-state imaging device includes: a device portion in which unit constituent elements, each of which includes a charge detection unit detecting a charge that is generated on the basis of changes in physical information and a transfer unit transferring a signal charge detected by the charge detection unit, are arranged in a predetermined direction; and a supplied voltage control portion capable of transferring a part of the charge detected by the charge detection unit through supplying of a control voltage for suppressing blooming to the transfer unit and capable of transferring the signal charge detected by the charge detection unit through supplying of a first control voltage that is different from the control voltage for suppressing the blooming to the transfer unit.

13 Claims, 21 Drawing Sheets

TYPICAL READING

WHEN INCIDENT LIGHT IS WEAK

WHEN INCIDENT LIGHT IS STRONG

BLOOMING

RELATIONSHIP BETWEEN BM CONTROL VOLTAGE Vbm AND STORABLE
CHARGE AMOUNT OF CHARGE GENERATION UNIT 32

RELATIONSHIP BETWEEN BM CONTROL VOLTAGE Vbm AND STORABLE
CHARGE AMOUNT OF CHARGE GENERATION UNIT 32

<MULTIPLE TIMES BM SHUTTER: BM CONTROL VOLTAGE Vbm FOR EACH TIME IS OPTIMUM VOLTAGE> ※EXAMPLE OF N=4

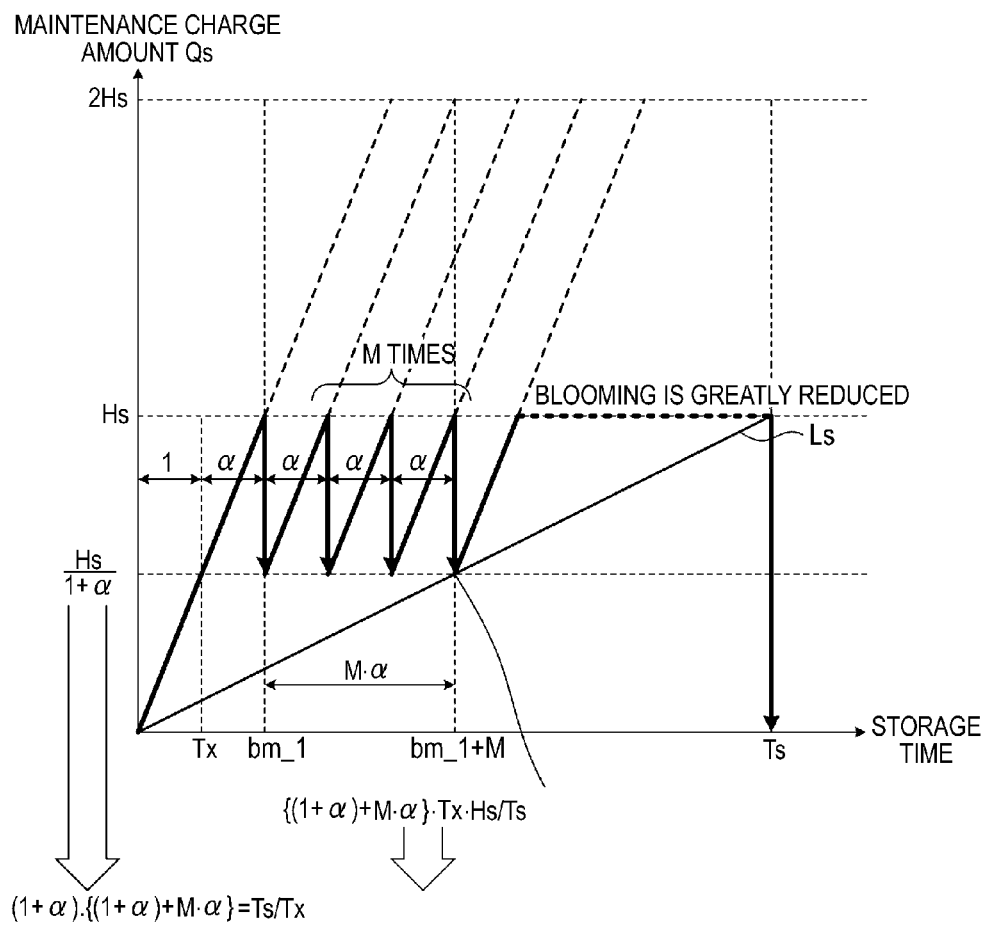

<MULTIPLE TIMES BM SHUTTER: BM CONTROL VOLTAGES Vbm FOR EACH TIME ARE EQUAL TO ONE ANOTHER>

FIG.15A
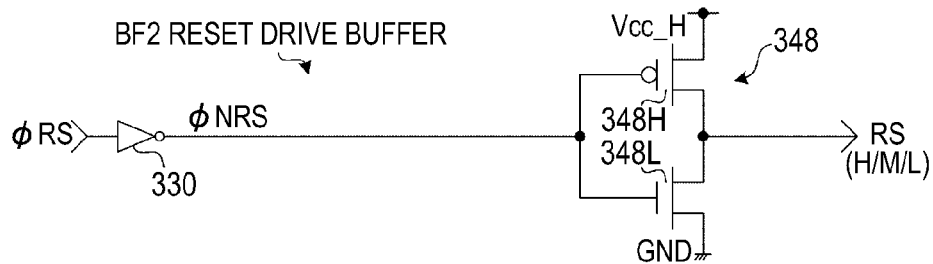
FIG.15B
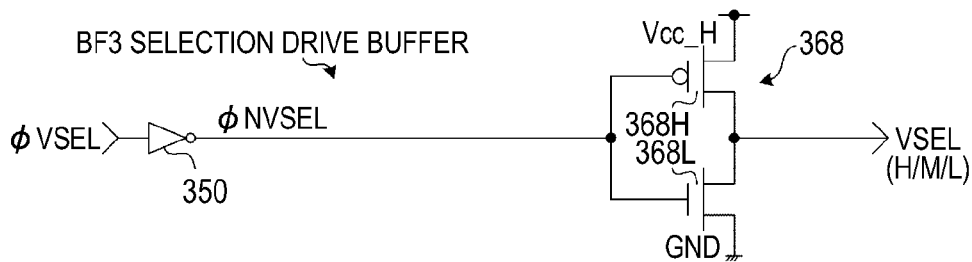
FIG.15C
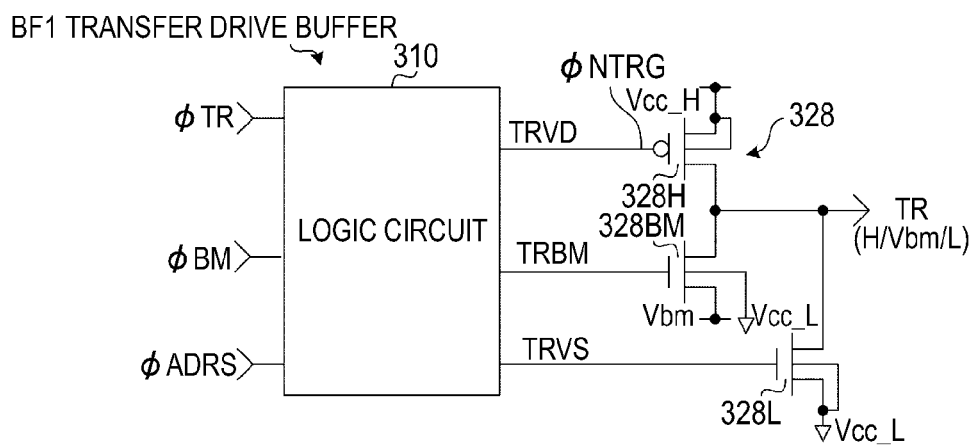
FIG.15D
| φADRS | φTR (INPUT) | φBM (INPUT) | TRVD (328H) | TRBM (328BM) | TRVS (328L) | TR (OUTPUT) |
|---|---|---|---|---|---|---|
| L | NIL | NIL | H (OFF) | L (OFF) | H (ON) | Vcc_L |
| H | L | L | H (OFF) | L (OFF) | H (ON) | Vcc_L |
| H | L | H | H (OFF) | H (ON) | L (OFF) | Vbm |
| H | H | L | L (ON) | L (OFF) | L (OFF) | Vcc_H |
| H | H | H | ※ | ※ | ※ | ※ |
PROHIBIT: MAY BE Vcc_L

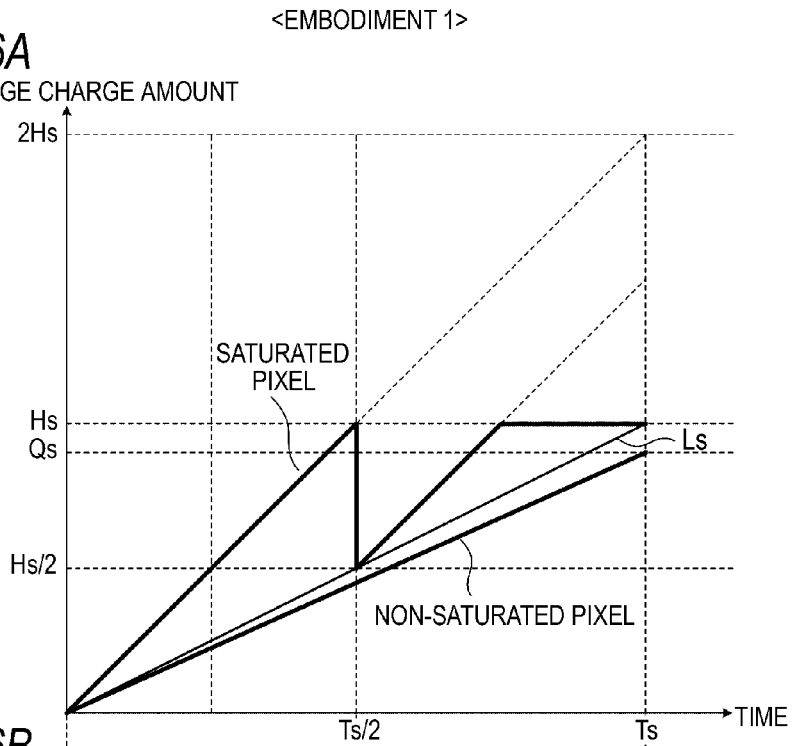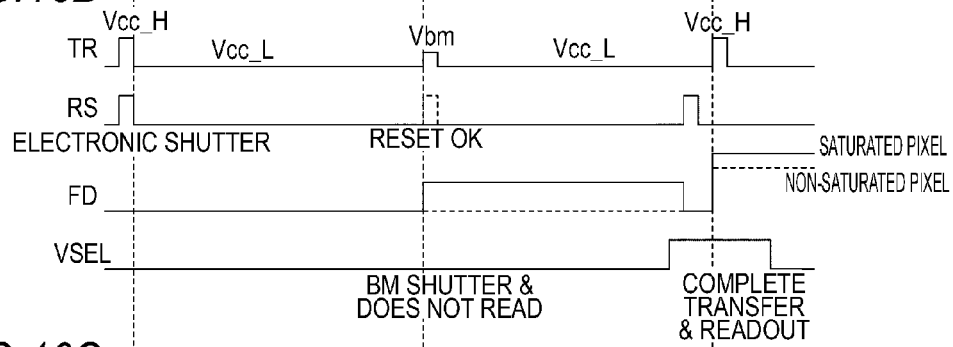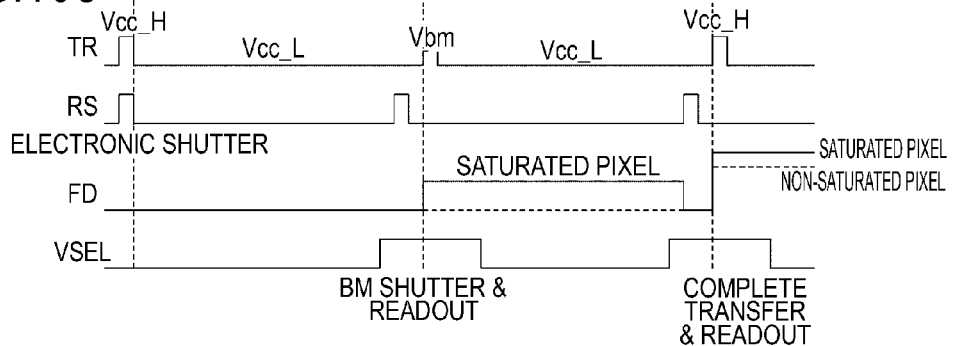

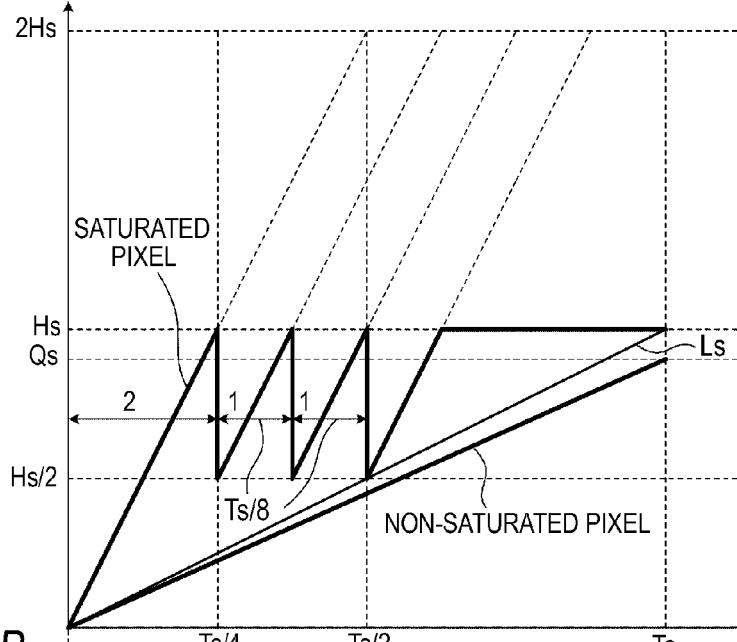
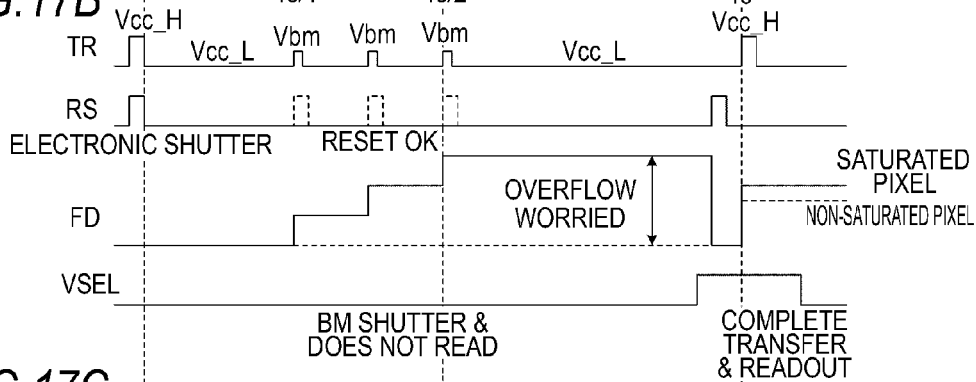
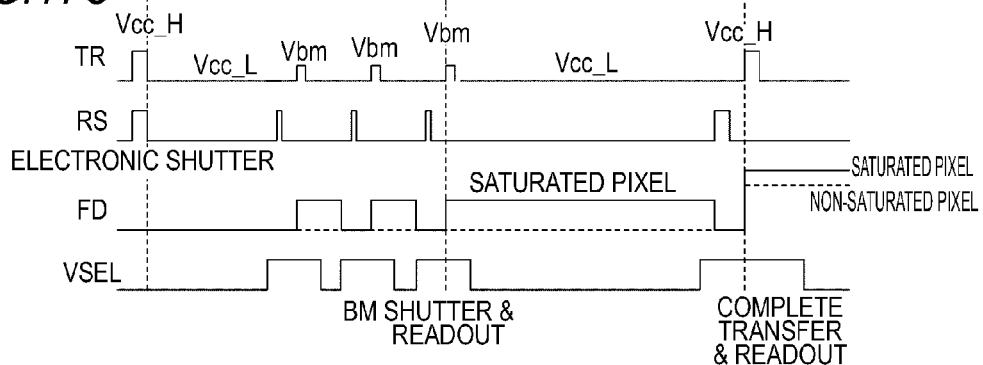

<EMBODIMENT 3>

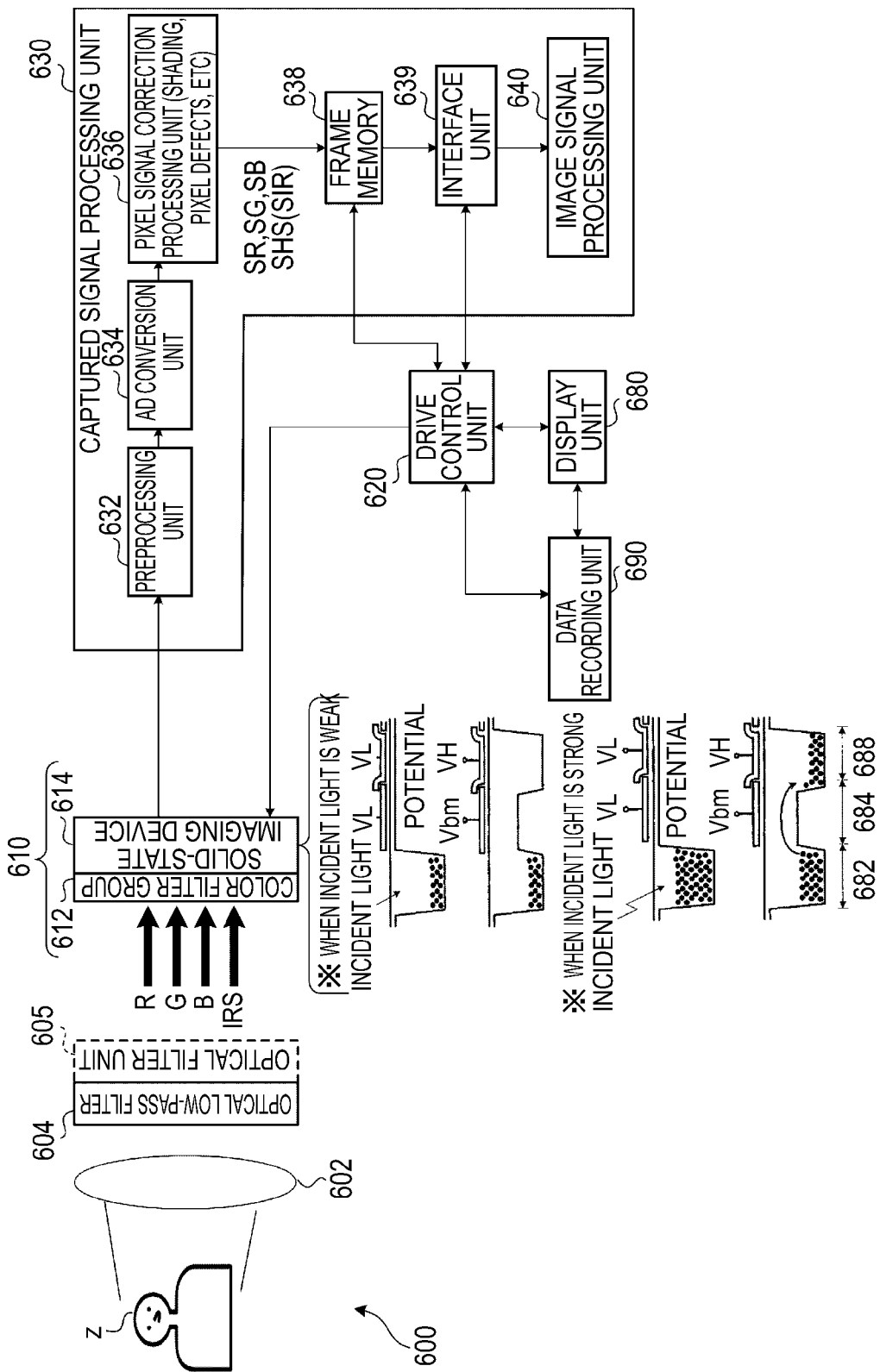

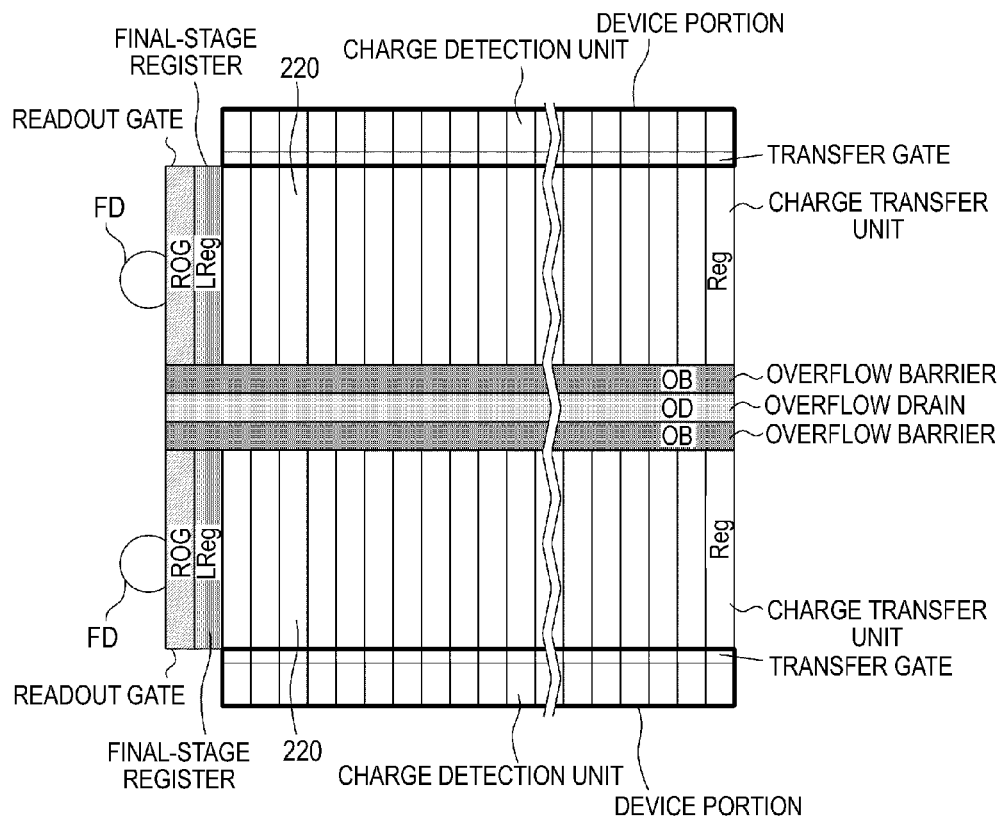
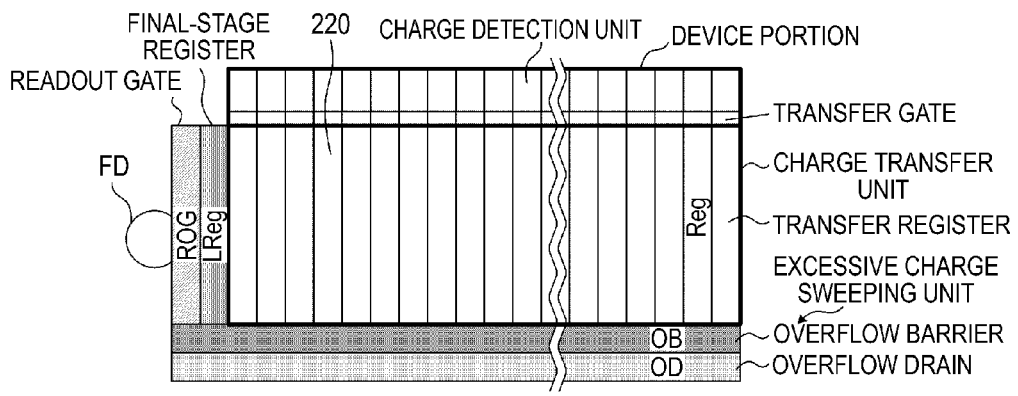

<EMBODIMENT 5: ELECTRONIC APPLIANCE>

SOLID-STATE IMAGING DEVICE, IMAGING APPARATUS, ELECTRONIC APPLIANCE, AND METHOD OF DRIVING THE SOLID-STATE IMAGING DEVICE

FIELD

The present disclosure relates to a solid-state imaging device, an imaging apparatus, an electronic appliance, and a method of driving the solid-state imaging device.

BACKGROUND

A charge detection device, a charge transfer device, a solid-state imaging device or an imaging apparatus has been used in various kinds of electronic appliances. A physical quantity distribution detection semiconductor device that reads a physical quantity distribution (for example, pressure distribution or the like) that has been converted into an electrical signal by unit constituent elements as the electrical signal or a solid-state imaging device that deals with image information as the physical quantity distribution has been used in various fields. For example, unit constituent elements (for example, unit pixels) having a charge detection function for detecting a charge that is generated on the basis of changes in electromagnetic waves, pressure, or other various kinds of physical information, such as having sensitivity to the externally input electromagnetic waves such as light or radiation or detecting a charge that is generated on the basis of pressure changes, have been arranged in a linear shape or matrix. For example, in the field of video appliances, solid-state imaging devices of a CCD (Charge Coupled Device) type that detect light among physical quantities, a MOS (Metal Oxide Semiconductor) type, or a CMOS (Complementary Metal-oxide Semiconductor) type have been used (for example, see JP-A-2008-99158). They read physical quantity distribution that has been converted into an electrical signal by unit constituent elements (pixels in the solid-state imaging device) as the electrical signal.

SUMMARY

Here, for example, in the case of a large signal when a high-intensity light is incident, a blooming phenomenon occurs, in which charge exceeds the saturation level and spills over into the adjacent pixels. The blooming causes image deterioration, such as expansion of a blown-out highlights area or false color.

Thus, it is desirable to provide a technology capable of suppressing image deterioration due to a blooming phenomenon.

A first embodiment of the present disclosure is directed to a solid-state imaging device which includes a device portion in which unit constituent elements, each of which includes a charge detection unit detecting a charge that is generated on the basis of changes in physical information and a transfer unit transferring a signal charge detected by the charge detection unit, are arranged in a predetermined direction; and a supplied voltage control portion capable of transferring a part of the charge detected by the charge detection unit through supply of a control voltage for suppressing blooming to the transfer unit (specifically, to a control electrode thereof, and so forth) and capable of transferring the signal charge detected by the charge detection unit through supply of a first control voltage that is different from the control voltage for suppressing the blooming to the transfer unit. Respective solid-state imaging devices described in specific embodiments of the solid-state imaging device related to the first embodiment of the present disclosure define further advantageous specific examples of the solid-state imaging device related to the first embodiment of the present disclosure.

A second embodiment of the present disclosure is directed to an imaging apparatus which includes a device portion in which unit constituent elements, each of which includes a charge detection unit detecting a charge that is generated on the basis of changes in physical information and a transfer unit transferring a signal charge detected by the charge detection unit, are arranged in a predetermined direction; an incident system leading the physical information to the charge detection unit; and a supplied voltage control portion capable of transferring a part of the charge detected by the charge detection unit through supply of a control voltage for suppressing blooming to the transfer unit and capable of transferring the signal charge detected by the charge detection unit through supply of a first control voltage that is different from the control voltage for suppressing the blooming to the transfer unit. Respective technologies and methods described in specific embodiments of the solid-state imaging device related to the first embodiment are applicable to the imaging apparatus related to the second embodiment of the present disclosure, and configuration to which the technologies and methods are applied defines further advantageous specific examples of the imaging apparatus related to the second embodiment of the present disclosure.

A third embodiment of the present disclosure is directed to an electronic appliance which includes a device portion in which unit constituent elements, each of which includes a charge detection unit detecting a charge that is generated on the basis of changes in physical information and a transfer unit transferring a signal charge detected by the charge detection unit, are arranged in a predetermined direction; a supplied voltage control portion capable of transferring a part of the charge detected by the charge detection unit through supply of a control voltage for suppressing blooming to the transfer unit and capable of transferring the signal charge detected by the charge detection unit through supply of a first control voltage that is different from the control voltage for suppressing the blooming to the transfer unit; and a signal processing portion processing a signal on the basis of the signal charge detected by the device portion. Respective technologies and methods described in specific embodiments of the solid-state imaging device related to the first embodiment are applicable to the electronic appliance related to the third embodiment of the present disclosure, and configuration to which the technologies and methods are applied defines further advantageous specific examples of the electronic appliance related to the third embodiment of the present disclosure.

A fourth embodiment of the present disclosure is directed to a method of driving a solid-state imaging device having a device portion in which unit constituent elements, each of which includes a charge detection unit detecting a charge that is generated on the basis of changes in physical information and a transfer unit transferring a signal charge detected by the charge detection unit, are arranged in a predetermined direction, which includes transferring a part of the charge detected by the charge detection unit through supply of a control voltage for suppressing blooming to the transfer unit and transferring the signal charge detected by the charge detection unit through supply of a first control voltage that is different from the control voltage for suppressing the blooming to the transfer unit. Respective technologies and methods described in specific embodiments of the solid-state imaging device related to the first embodiment are applicable to the method of driving the solid-state imaging device related to the fourth embodiment of the present disclosure, and configurations to which the technologies and methods are applied define further advantageous specific examples of the method of driving the solid-state imaging device related to the fourth embodiment of the present disclosure.

For example, according to the disclosure disclosed in the present specification, in processing a signal on the basis of signal charge detected by a device portion, a control voltage for suppressing blooming is first supplied to a transfer unit, and a part of the charge detected by a charge detection unit is transferred. The control voltage for suppressing the blooming is different from a first control voltage that is used to read the signal on the basis of the signal charge detected by the device portion thereafter. The control voltage for suppressing the blooming is supplied to the transfer unit prior to the supply of the first control voltage to the transfer unit (specifically, a control electrode thereof, and so forth), and in the case where an amount of changes in physical information exceeds a saturation charge amount of the charge detection unit in the specified charge detection time, a part of the charge that is detected by the charge detection unit is transferred through the transfer unit when the control voltage for suppressing the blooming is supplied to the transfer unit. That is, through application of the control voltage for suppressing the blooming before the charge exceeds the saturation level (surplus charge overflows from the charge detection unit), a part of the surplus charge may be discharged in advance through the transfer unit.

For example, in the case where an incident light is weak, a small amount of charge is generated by the charge detection unit, and the signal charge does not exceed the potential of the transfer unit that is caused by the application of the blooming control voltage. Accordingly, the detected charge is maintained in the charge detection unit, and then is completely transferred through the application of the first control voltage finally to be read as the signal level. On the other hand, if the incident light is strong, a large amount of charge is generated by the charge detection unit, and a part of the signal charge exceeds the potential of the transfer unit that is caused by the application of the blooming control voltage to be transferred. From this, in low light intensity, the signal can be read through a complete transfer after a sufficient exposure time without signal deterioration, while in high light intensity, the blooming amount can be reduced by as much as the surplus amount that exceeds the potential that is caused by the application of the blooming control voltage.

According to the solid-state imaging device related to the first embodiment, the imaging apparatus related to the second embodiment, the electronic appliance related to the third embodiment, and the method of driving the solid-state imaging device driving method related to the fourth embodiment, a part of the surplus charge can be discharged in advance in the case of the large signal, and thus the image deterioration due to the blooming phenomenon can be suppressed.

BRIEF DESCRIPTION OF THE DRAWINGS

FIG. 10 is a diagram (diagram 1) explaining a modified example of BM shutter timing and BM control voltage setting conditions;

FIGS. 15A to 15D are diagrams explaining the configuration example of a transfer drive buffer;

FIGS. 16A to 16C are diagrams explaining a pixel driving method according to embodiment 1;

FIGS. 17A to 17C are diagrams explaining a pixel driving method according to embodiment 2;

FIG. 19 is a diagram explaining embodiment 4;

FIGS. 20A and 20B are diagrams explaining embodiment 5; and

DETAILED DESCRIPTION

Figure 1:
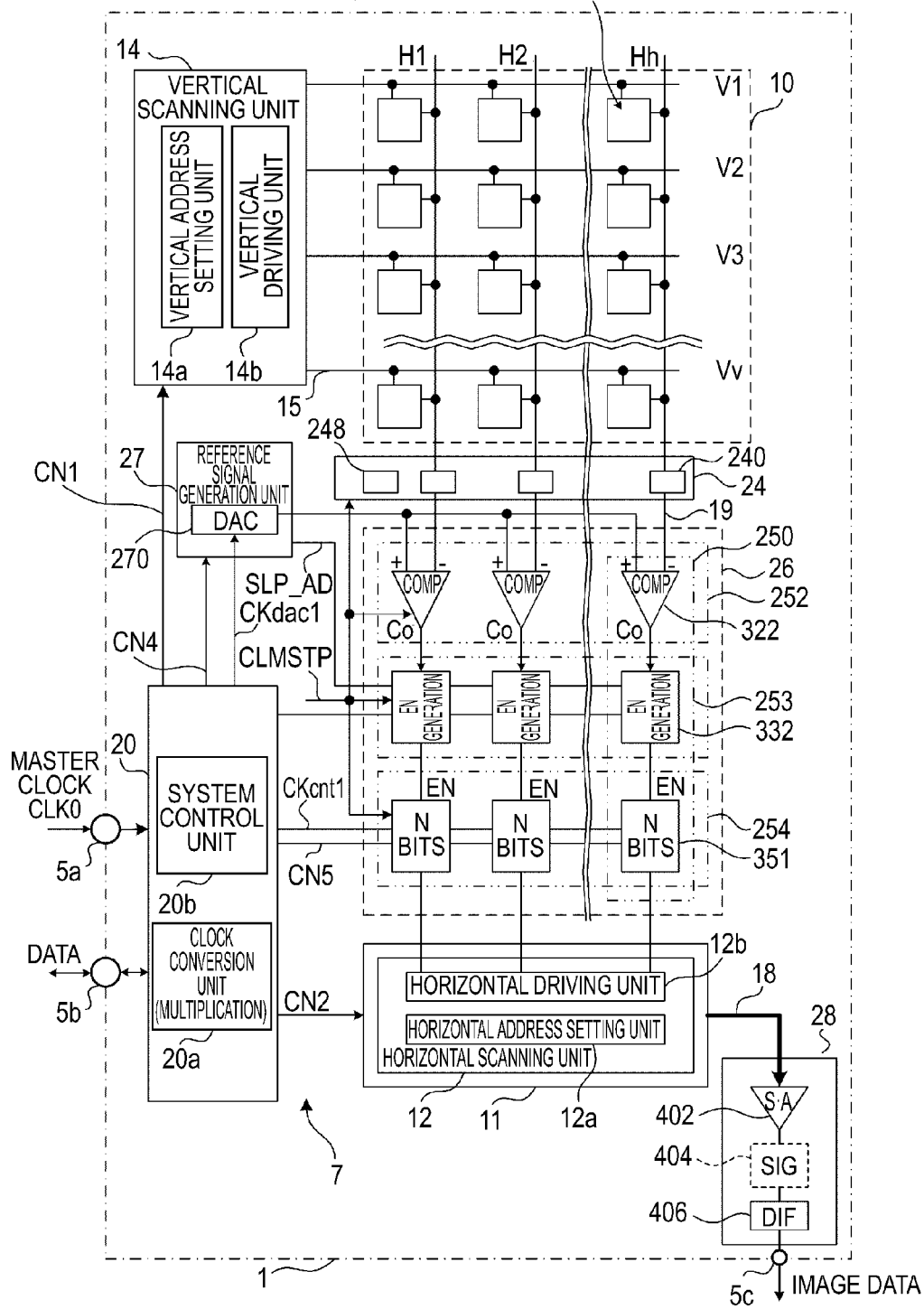
FIG. 1 is a basic configuration diagram of a CMOS solid-state imaging device according to an embodiment.

Hereinafter, with reference to the accompanying drawings, embodiments of the present disclosure will be described. In the case where the types of functional elements are distinguished from one another, the respective functional elements are described with references of a letter, "_n" (n is a figure), or a combination thereof, while in the case where the types of functional elements are not specially distinguished from one another, the respective functional elements are described with the references omitted. The same applies to the drawings.

The explanation thereof will be made in the following order.

1. Outline
2. Solid-state imaging device: Basic configuration and operation
3. Anti-blooming shutter (BM shutter): Blooming phenomenon, principle of countermeasures
4. BM shutter timing and control voltage
5. Vertical scanning unit
6. Pixel driving circuit
7. Specific application examples
Embodiment 1: BM shutter once
Embodiment 2: BM shutter multiple times, same BM control voltage each time
Embodiment 3: Combined with dynamic range expansion using intermediate voltage shutter
Embodiment 4: Application example to imaging apparatus Embodiment 5: Application example to linear sensor Embodiment 6: Application example to other electronic appliances <Outline>

First, basic matters will be described hereinafter.

In the configuration according to this embodiment, a solid-state imaging device or an imaging apparatus includes a device portion and a supplied voltage control portion. The device portion has unit constituent elements which include transfer units transferring a signal charge and are arranged in a predetermined direction. The supplied voltage control unit is capable of transferring a part of the charge detected by the charge detection unit through supply of a control voltage for suppressing blooming to the transfer unit and is capable of transferring the signal charge detected by the charge detection unit through supply of a first control voltage that is different from the control voltage for suppressing the blooming to the transfer unit. The first control voltage is a voltage at which stored charge of the charge detection unit can be completely transferred through the transfer unit.

Hereinafter, the first control voltage may also be described as a "complete transfer voltage". The supply of the first control voltage to the transfer unit may also be described as performing (or "applying") of "complete transfer". The supply of the control voltage for suppressing the blooming may also be described as performing (or "applying") of an anti-blooming shutter. The control voltage for suppressing blooming may also be described as "blooming control voltage". The unit constituent elements of the device portion may be arranged either on a line or in a two-dimensional (2D) matrix. That is the solid-state imaging device may be a line sensor or an area sensor.

Preferably, the unit constituent element may be additionally provided with a charge storage unit storing charge transferred by the transfer unit or a reset unit resetting the charge storage unit at a predetermined potential. Further, the unit constituent element may have an amplifying transistor that amplifies the signal charge transferred from the charge detection unit by the transfer unit as a signal voltage. In this case, the unit constituent elements are driven by the driving unit. The charge storage unit may be represented by a floating diffusion or floating gate, but is not limited thereto.

Here, as a preferable set value of the blooming control voltage, in the case where changes in physical information are made beyond a saturation charge amount of the charge detection unit in a specified charge detection time, it is sufficient if a part of the charge that is detected by the charge detection unit is transferred when the blooming control voltage is supplied to the transfer unit. That is, in the case of a large signal that exceeds the saturation charge amount, the blooming control voltage is set to the extent that the anti-blooming shutter functions. In other words, the blooming control voltage is a voltage at which the charge detection unit can maintain the charge amount that corresponds to the saturation charge amount of the charge detection unit when the anti-blooming shutter is performed. Here, the "charge amount that corresponds to the saturation charge amount of the charge detection unit" means a charge amount that is obtained by multiplying the saturation charge amount by the ratio of time taken from a start of charge detection through the charge detection unit to performing of an anti-blooming shutter to a "prescribed storage time" unit if it is assumed that a charge amount reaches the saturation charge amount of the charge detection unit at the prescribed storage time.

For example, the blooming control voltage may be supplied to the transfer unit only once. That is, the anti-blooming shutter may be applied only once. The optimum value of the blooming control voltage in this case may be a voltage at which the charge detection unit can maintain the charge amount that corresponds to the saturation charge amount of the charge detection unit when the anti-blooming shutter is performed. In other words, if it is assumed that time taken from the start of charge detection through the charge detection unit to the application of the anti-blooming shutter is Tbm and the charge amount reaches the saturation charge amount Hs of the charge detection unit at a storage time Ts, it is quite suitable to set the blooming control voltage to a value at which the charge detection unit can maintain the charge amount of Tbm×Hs/Ts.

The blooming control voltage is supplied to the transfer unit only once. That is, in the case where the anti-blooming shutter is applied only once, the blooming control voltage may be supplied to the transfer unit when the time reaches a certain time point (predetermined timing), or the supply of the control voltage for suppressing the blooming to the transfer unit may continue until the predetermined time after the charge detection unit starts the charge detection. In the latter case, the optimum value of the blooming control voltage may be the voltage at which the charge detection unit can maintain the charge amount that corresponds to the saturation charge amount of the charge detection unit when the supply of the blooming control voltage to the transfer unit is stopped. In other words, if it is assumed that time taken from the start of charge detection through the charge detection unit to the stopping of the anti-blooming shutter is Tbm and the charge amount reaches the saturation charge amount Hs of the charge detection unit at a storage time Ts, it is quite suitable to set the blooming control voltage to a value at which the charge detection unit can maintain the charge amount of Tbm×Hs/Ts.

The supplied voltage control unit may supply the control voltage for suppressing the blooming to the transfer unit multiple times. That is, the anti-blooming shutter is not limited to once, but may be performed multiple times.

In the case of performing the anti-blooming shutter multiple times, in each time, it is optimum to set the blooming control voltage that can be obtained in the same manner as the case where the anti-blooming shutter is applied once. The optimum value of the blooming control voltage in this case may be a voltage at which the charge detection unit can maintain the charge amount that corresponds to the saturation charge amount of the charge detection unit when the anti-blooming shutter is performed multiple times. In other words, if it is assumed that time taken from the start of charge detection through the charge detection unit to the application of the anti-blooming shutter at the time is Tbm and the charge amount reaches the saturation charge amount Hs of the charge detection unit at a storage time Ts, it is quite suitable to set the blooming control voltage to a value at which the charge detection unit can maintain the charge amount of Tbm×Hs/Ts. Specifically, the n-th blooming control voltage may be set to a value at which the charge detection unit can maintain the charge amount of n×Hs/N (n=1 to N−1), and the anti-blooming shutter may be performed N−1 (N≥2) times at intervals of Ts/N.

In this case, however, set values are prepared with respect to the multiple times. In other words, functional units for generating the voltages are prepared. A configuration that can change voltage values is necessary each of the multiple times, and thus the circuit scale is increased. As a countermeasure for this, the same voltage value may be used for each time. The optimum value of the blooming control voltage in this case may be a voltage at which the charge detection unit can maintain the charge amount that corresponds to the saturation charge amount of the charge detection unit when the anti-blooming shutter is performed last time. In other words, the blooming control voltage each of the multiple times may be commonly set to a value at which the charge detection unit can maintain the charge amount of (N−1)×Hs/N, and the anti-blooming shutter may be performed N−1 (N≥2) times at intervals of Ts/N.

Further it is preferable to perform the first time anti-blooming shutter when time of 2×Ts/N elapses after the charge detection unit starts the charge detection. Further, it is preferable to set the blooming control voltage to a value at which the charge detection unit can maintain the charge amount of Hs/2.

The technology of performing the anti-blooming shutter according to this embodiment may be commonly used with a technology of expanding a dynamic range using a signal that is obtained by supplying an intermediate voltage to the transfer unit. Here, in order to realize the technology of expanding a dynamic range, for example, it is preferable that the configuration include a first driving unit driven to read the signal charge stored in the unit constituent elements in a first charge detection period and to output the readout signal charge from the device portion as a first image signal, and a second driving unit driven to read the signal charge stored in the unit constituent elements that output the first image signal in proportion to the first charge detection period that is determined by a time interval to drive the transfer unit in the first charge detection period and to output the readout signal charge from the device portion as a second image signal having a different sensitivity from the first image signal.

In this case, it is preferable that the second driving unit be driven to read the signal charge stored in the unit constituent elements that output the first image signal in proportion to the plural exposure times that are determined by a time interval to drive the transfer unit in the first exposure period and to sequentially output the readout signal charge from the device portion as an image signal having plural sensitivities that are different from the first image signal.

As other forms for realizing a technology to expand the dynamic range, the supplied voltage control portion includes a first supplied voltage control unit supplying the first control voltage to the transfer unit, a second supplied voltage control unit sequentially supplying one or plural second control voltages having a different voltage value from the first control voltage to the transfer unit, and a third supplied voltage control unit supplying once or multiple times a third control voltage having the same voltage value of either the one or multiple second control voltages prior to the supply of the one or plural second control voltages. In this case, in order to acquire the image signal, it is preferable that a first driving unit be driven to read the signal charge transferred by the transfer unit when the first control voltage is supplied and a second driving unit be driven to read the signal charge transferred by the transfer unit once or more when the second control voltage is sequentially supplied.

Hereinafter, the supply of the second control voltage to the transfer unit may also be described as "performing (or "applying") of an intermediate shutter for intermediate readout". The second control voltage may also be described as "control voltage for intermediate readout" or "intermediate voltage for intermediate readout". The supply of the third control voltage may also be described as performing (or "applying") of the intermediate shutter for suppressing threshold variation. The third control voltage may also be described as "control voltage for suppressing threshold variation" or "intermediate voltage for suppressing threshold variation. The intermediate voltage for intermediate readout and the intermediate voltage for suppressing the threshold variation may be gathered and may also be described simply as "intermediate voltage".

The second control voltage is set to a voltage at which the transfer unit can transmit stored charge that exceeds the maintenance amount in a state where a part of the charge that is stored in the charge detection unit is maintained. The optimum value of the second control voltage in this case may be a voltage at which the charge detection unit can maintain the charge amount that corresponds to the saturation charge amount of the charge detection unit when the intermediate shutter for intermediate readout is performed once or multiple times. In other words, if it is assumed that time taken from the start of charge detection through the charge detection unit to the application of the intermediate shutter for the intermediate readout at the time is Trd and the charge amount reaches the saturation charge amount Hs of the charge detection unit at a storage time Ts, it is quite suitable to set the control voltage for the intermediate readout to a value at which the charge detection unit can maintain the charge amount of Trd×Hs/Ts.

It is preferable to additionally provide a reset unit resetting the charge storage unit that stores the charge transferred by the transfer unit to a predetermined potential before the supply of the first control voltage and the supply of the second control voltage. The charge storage unit may be represented by a floating diffusion or floating gate, but is not limited thereto.

More preferably, a third supply voltage control unit may supply the third control voltage multiple times at equal intervals when the third control voltage precedes the multiple supplies of the second control voltage. Further, the third supply voltage control unit may supply the third control voltage at different intervals in the multiple supplies. Further, the second supply voltage control unit may supply the second control voltage having different voltage values in the multiple supplies.

The unit constituent element may be configured to have an amplifying transistor that amplifies the signal charge transferred from the charge detection unit by the transfer unit as a signal voltage. In this case, the first driving unit and the second driving unit are driven to read the signal charge transferred to the amplifying transistor by the transfer unit through the amplifying transistor. Further, the first driving unit and the second driving unit may be configured to have a charge transfer unit that transfers the signal charge transferred from the charge detection unit by the transfer unit, and in this case, the first driving unit and the second driving unit are driven to read the signal charge transferred to the charge transfer unit by the transfer unit through the charge transfer unit.

The first driving unit and the second driving unit may have, in order to read the signal charge transferred by the transfer unit, a functional unit sequentially selecting one row or plural rows in a 2D arrangement of the unit constituent elements through scanning and supplying the first to third control voltages to the transfer unit, and a functional unit performing the operation of selecting one row or plural rows and supplying the first to third control voltages to the transfer unit multiple times prior to the rows selected by progressive scanning.

For example, if an incident light is weak, the charge that is generated by the charge detection unit is decreased and the signal charge does not exceed the potential of the transfer unit that is caused by the application of the second control voltage. Accordingly, the detected charge is maintained in the charge detection unit, and then is completely transferred through the application of the final first control voltage to be read as the signal level. On the other hand, if the incident light is strong, the charge that is generated by the charge detection unit is increased, and a part of the signal charge exceeds the potential of the transfer unit that is caused by the application of the second control voltage to be transferred. This part is sequentially read as the signal level. From this, in low light intensity, the signal can be read through a complete transfer after a sufficient exposure time without signal deterioration, while in high light intensity, the surplus amount that exceeds the potential that is caused by the application of the second control voltage is read in stages, and a synthetic image with a wide dynamic range can be finally prepared.

In creating a "synthetic image", the following is preferable. With respect to signals obtained by the intermediate transfer through supply of the intermediate voltage multiple times, continuous input/output characteristics can be obtained by clipping and adding the signals that are obtained by the intermediate transfer through the supply of the intermediate voltage multiple times with a predetermined saturation level. For example, in a typical exposure that is the i-th readout, the result of complete transfer is output with high S/N up to the typical saturation level through the supply of the first control voltage, and in the (i-1)-th transfer, the intermediate transfer is performed with ½ of the charge detection period (exposure time) to make approximately twice the dynamic range possible. Further, in the (i-2)-th transfer, the intermediate transfer is performed with ⅛ of the charge detection period to make approximately eight times the dynamic range possible, and by clipping and adding them in the vicinity of respective saturation levels, continuous characteristics can be obtained. The processing for high S/N and wide dynamic range through performing of such clipping and addition is executed using a frame memory for storing images which are read multiple times in a signal processing circuit that is installed at the rear end of the solid-state imaging device. However, this processing example is merely exemplary, and such a functional unit may be installed in the solid-state imaging device. That is, by mounting the frame memory on the solid-state imaging device, it is also possible to adopt the configuration in which the solid-state imaging device performs the processing and outputs only the final image. So far as the images that are read multiple times are preserved, any configuration may be adopted, and for example, a personal computer or the like may also be adopted to perform the processing.

For example, by reading the signal through the supply of one or plural second control voltages in a charge detection period (exposure period) until the complete transfer for supplying the first control voltage to the transfer unit is performed after the electronic shutter is cut off, information in a high-intensity area is also acquired in a state where high S/N is ensured in a low-intensity area. Further, the threshold value difference of the transfer unit (specifically, transfer transistor) can be effectively suppressed by transferring the signal multiple times using plural intermediate voltages (the second control voltage and the third control voltage) and resetting the charge storage unit to a specified potential without performing reading once or several times with respect to the supply of the third control voltage.

Further, if the value of the intermediate voltage (second control voltage) that is applied during the intermediate readout operation is different from the value of the intermediate voltage (third control voltage) that is precedingly applied to suppress the threshold value variation of the transfer unit, a predetermined characteristic variation may not be sufficiently suppressed. The "predetermined characteristic variation" may be an offset value of the intermediate voltage being supplied, an offset value of the intermediate voltage in the pixel arrangement, variation in the time in which the intermediate voltage is applied to the transfer unit in the pixel arrangement, and the amount of residual charge transfer in transferring the intermediate voltage. In this point, it is preferable that the second control voltage and the third control voltage be the "same voltage value. Since the "same voltage value" does not mean only a case where the voltage values are completely equal to each other, there may be some errors in the range of several %.

In the technology of expanding such a dynamic range, it is preferable that the unit constituent element be a pixel having a transfer unit during destructive readout. A first image signal is a high-sensitivity image signal with a first exposure time, and a second image signal is a low-sensitivity image signal with a second exposure time that is set within the first exposure time. The first image signal and the second image signal are read from the same unit constituent element without spatially dividing the device portion (pixel arrangement). Since the storage operation with the second exposure time can be set in any timing within the first exposure time, the timing of reading the second image signal becomes any time. Through this, a high frame rate that depends on the shortest exposure time interval is not necessary, and an image signal with a shorter exposure time can be obtained with a frame rate that is determined by the number of readings of the image signal. As the second exposure time is set within the first exposure time, it is not necessary to temporarily divide the frame period. Accordingly, in order to maximally ensure time that is equal to the frame period as the first exposure time, it is possible to acquire a high-S/N (high-quality) image signal without degrading the sensitivity of the first image signal as the expansion of the dynamic range is sought in the second exposure time. Since the signal acquisition with linear and high S/N is possible without narrowing the typical saturation level at low light intensity and the dynamic range can be expanded as realizing a good S/N in a linear area even with respect to the incident light having typical saturation level or more, high-quality image with high S/N can be acquired with respect to a scene having a low light intensity in ambient light changes in various environments, and a small saturated image in high-intensity scene having high-quality image can be acquired in linear response. Further, even in a scene having high contrast in which low intensity and high intensity coexist, the saturation of a high-intensity portion can be avoided as high S/N is maintained in the low-intensity portion.

If an anti-blooming shutter is applied to the technology of expanding the dynamic range, the blooming phenomenon is suppressed, and an image of the wide dynamic range can be acquired. Here, it is preferable that the anti-blooming shutter does not exert an influence on the acquisition of the second image signal for generating a wide dynamic range image. Because of this, the control voltage for suppressing the blooming is supplied to the transfer unit in a range in which time for acquiring the second image signal can be ensured between a time point where the control voltage for suppressing the blooming is supplied and a time point where the first control voltage is supplied. The time for acquiring the second image signal (also described as "storage time for short-time storage") may be a time interval between a time point where the third control voltage is supplied to the transfer unit and a time point where the second control voltage is supplied to the transfer unit, or may be a time interval for making the time intervals between the third control voltages equal to each other in the case where the third control voltage is supplied to the transfer unit multiple times prior to each supply of the second control voltage to the transfer unit. For example, in the case of performing the anti-blooming shutter (N−1) times at intervals of $\alpha(=Ts/N)$, it is preferable to add the anti-blooming shutter only in the case where the relationship between the storage times T of short-time storages is α≧T. By doing so, the blooming can be avoided without exerting an influence on the effect of the intermediate shutter for expanding the dynamic range. High-quality image with less blooming can be acquired without exerting an influence on the signal output for expanding the dynamic range through the intermediate voltage shutter and the intermediate readout.

Further, the configuration according to this embodiment can be applied to anything that detects changes in various kinds of physical quantities as changes in the charge amount without being limited to the solid-state imaging device provided with the charge detection unit having sensitivity with respect to externally input electromagnetic waves, such as light or radiation. For example, the configuration according to this embodiment can be applied to other devices that detect physical changes, such as a fingerprint authentication device for detecting an image of the fingerprint on the basis of the changes in the electrical characteristics or optical characteristics based on the pressure, with respect to information on the fingerprint. For example, the technology according to the present disclosure may be applied to a detection unit in a touch panel. Further, although a fingerprint authentication device for detecting an image of the fingerprint on the basis of the changes in the electrical characteristics or the optical characteristics based on the pressure, with respect to information on the fingerprint, is used in the field of a computer device, this is to read the physical quantity distribution, which has been converted into an electrical signal by the unit constituent element (pixel in the solid-state imaging device) as the electrical signal, and thus the technology of the present disclosure can be applied thereto. A camera module that is mounted on the electronic appliance may also be called an imaging apparatus. The configuration to be described hereinafter may be represented by the solid-state imaging device and an imaging apparatus on which the solid-state imaging device is mounted, but is not limited thereto, and can be applied to various kinds of electronic appliances having imaging function. As can be understood from this, the technology of the present disclosure is not limited to the technology described in the appended claims, and a physical quantity distribution detection semiconductor device or a physical information acquisition device having a function device, such as a charge detection device, a charge transfer device, or a solid-state imaging device, may be extracted as the technology proposed according to the present disclosure. Further, in the specification, unless otherwise noted (for example, as the points described separately in this section), the physical quantity distribution detection semiconductor device is described on behalf of the solid-state imaging device (in other words, the physical quantity distribution detection semiconductor device includes the solid-state imaging device), and the physical information acquisition device is described on behalf of the imaging apparatus (in other words, the physical information acquisition device includes the imaging apparatus).

<Solid-State Imaging Device: Basic Configuration and Operation>

Hereinafter, a case where a CMOS solid-state imaging device, which is an example of an X-Y address type solid-state imaging device, is used as a device will be described as an example. Unless otherwise noted, it is assumed that all unit pixels should be nMOS (n-channel MOS transistors) and signal charge is negative charge (electrons) in the CMOS solid-state imaging device. However, this is exemplary, and the subject device is not limited to the MOS solid-state imaging device. The unit pixel may be configured as pMOS (p-channel MOS transistor), and the signal charge may be a positive charge (holes). All types to be described hereinafter can equally be applied to all of physical quantity distribution detection semiconductor devices in which a plurality of unit pixels that are sensitive to externally input electromagnetic waves, such as light or radiation, are arranged on a line or a matrix and signals are read through address control.

[Basic Configuration]

Figure 2:
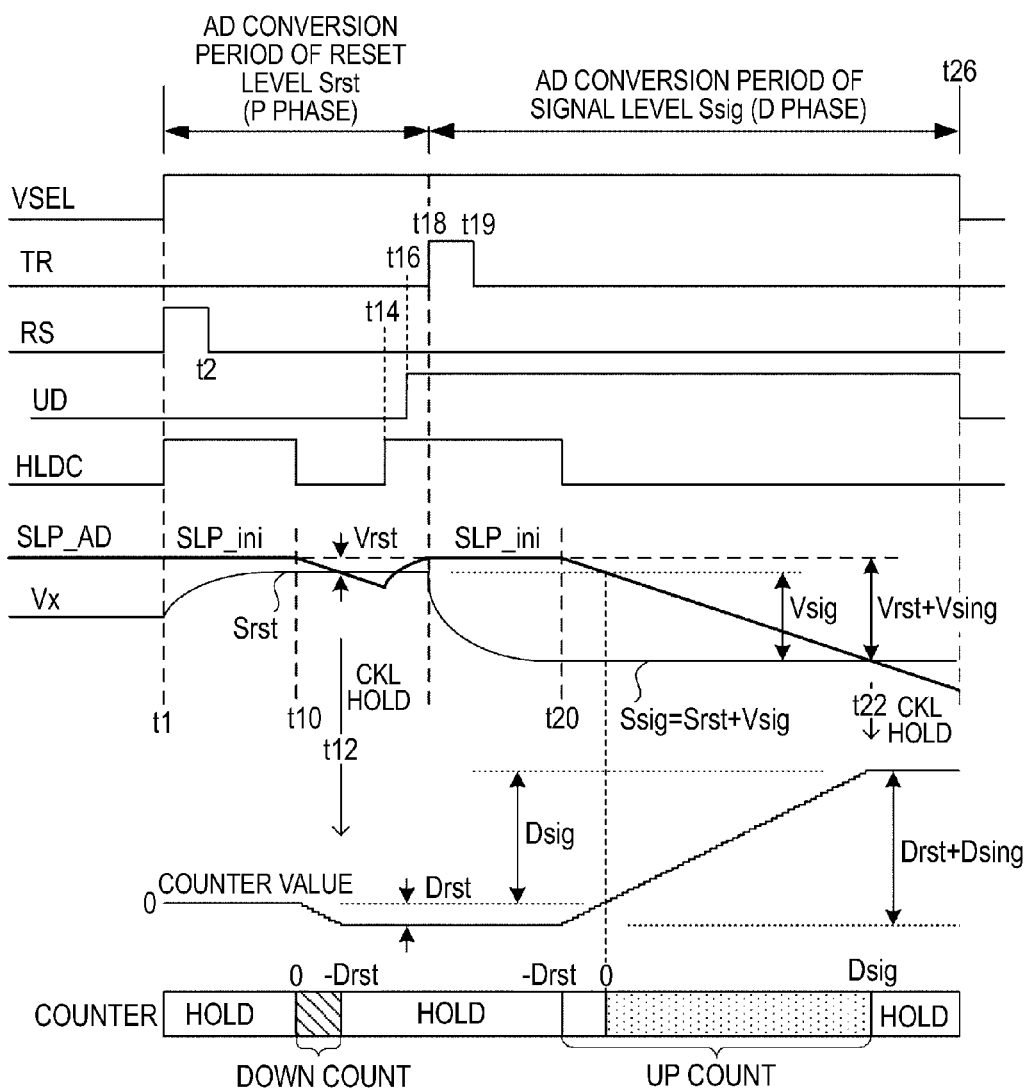
FIG. 2 is a timing chart explaining a signal acquisition differential process of a solid-state imaging device.

FIG. 1 is a basic configuration diagram of a CMOS solid-state imaging device (CMOS image sensor) that is one embodiment of a solid-state imaging device. The solid-state imaging device is an example of a semiconductor device. FIG. 2 is a timing chart explaining a signal acquisition differential process of a solid-state imaging device 1 illustrated in FIG. 1.

A solid-state imaging device 1 has a pixel array unit 10 in which a plurality of unit pixels 3 (example of unit constituent elements) are arranged on a 2D matrix. The solid-state imaging device 1 uses color separation filters in which RGB color filters are Bayer-arranged, and thus the pixel array unit 10 can correspond to color imaging. In FIG. 1, parts of a row and a column are omitted due to simplicity. However, in reality, several tens to several thousands of unit pixels 3 are arranged in each row or column. As described hereinafter, the unit pixel 3, for example, has an amplifier in each pixel which is provided with three or four transistors for charge transfer, reset, or amplification in addition to a photo diode as a photodetector that is an example of a detection unit. In the pixel array unit 10, unit pixels 3 are two-dimensionally arranged. The arrangement form is not limited to 2D lattice, but may be pixels in which the unit pixels 3 are arranged on an oblique lattice or the arrangement of the unit pixels 3 on a honeycomb. Further, in the case of a pixel shared configuration, the pixel array unit 10 is configured to have the unit pixels 3 in the figure that are included in a unit pixel group 2. That is, during the pixel sharing, the pixel array unit 10 is so configured that unit pixel groups 2 of a pixel shared configuration, in which part of elements of the unit pixels 3 are shared by plural unit pixels 3, are arranged on the row and the column.

A pixel signal voltage Vx is output from the unit pixel 3 through a vertical signal line 19 for each row. The pixel signal voltage Vx of the vertical signal line 19 shows a signal level Ssig (light receiving signal) after a reset level Srst (dark signal) that includes noise of a pixel signal of a reference level as time series. For example, the reset level Srst is a level that is obtained by adding a reset component Vrst to a feed-through level Sfeed. The signal level Ssig is a level that is obtained by adding a signal component Vsig to the reset level Srst, and the signal component Vsig can be obtained through Ssig (=Srst+Vsig)−Srst. This differential process corresponds to a CDS (Correlated Double Sampling) process. By acquiring the dark signal and the light receiving signal and acquiring the difference (level difference) between them, noise component rides on both the dark signal and an optical signal in the same manner, and thus the noise included in the difference becomes quite lowered.

One end of the vertical signal line is extended to the side of a column unit 26, a readout current source unit 24 is connected to the path thereof, and operating current (readout current) is supplied to the vertical signal line 19. An operating current supply unit 24 is provided with a current source 240 for each vertical signal line 19 (column), and a reference current source unit 248 used in common for each column.

The column unit 26 has a circuit configuration composed of a sample and hold circuit sampling and holding a signal output through the vertical signal line 19, or includes a sample and hold circuit and a noise removal circuit that removes reset noise or fixed pattern noise that is inherent to the pixel such as threshold value difference of the amplifying transistors through the CDS (Correlated Double Sampling) process. However, such configuration of the column unit 26 is merely exemplary, and is not limited thereto. For example, a configuration in which a column circuit 16 has an AD (Analog/Digital) conversion function to output the signal level as a digital signal may be adopted. Hereinafter, a case where the column circuit 16 has an AD conversion function will be described.

The column unit 26 has AD conversion units 250 which have a CDS processing function or a digital conversion function and are installed in parallel columns. That is, in the solid-state imaging device 1, a current source 240 and an AD conversion unit 250 are installed for each column. Although the details thereof will be described later, the column unit 26 includes a comparison unit 252, a count operation period control unit 253, and a count unit 254, and an AD conversion unit 250 is configured as a set of functional units for every one column. The term "parallel columns" means that a plurality of functional elements (in this example, AD conversion unit 250) such as CDS processing functional units or digital conversion units (AD conversion units) are installed in parallel with respect to the vertical signal line 19 (example of a column signal line) of a vertical column. This readout method is called a column readout method. In a typical column readout method, a column shared configuration in which the vertical signal line 19 and the AD conversion unit 250 are provided may be adopted. However, the configuration is not limited thereto, and a so-called column sharing configuration in which one AD conversion unit 250 is installed with respect to predetermined plural columns. In this case, although not illustrated, a vertical line selection unit that selects one vertical signal line 19 with respect to a plurality of columns that can be predetermined is installed in the column unit 26. By adopting the column shared configuration, comparators and counters in plural columns can be shared, an area that is occupied by the column unit 26 on a sensor chip can be reduced, and the manufacturing cost is lowered.

The solid-state imaging device 1 includes a drive control unit 7, a readout current source unit 24 supplying operating current (readout current) for reading a pixel signal to the unit pixel 3, a reference signal generation unit 27 supplying a reference signal SLP_ADC for AD conversion to the column unit 26, and an output unit 28.

The drive control unit 7 includes a horizontal transfer unit 11 for realizing a control circuit function for sequentially reading signals of the pixel array unit 10, a vertical scanning unit 14 (row scanning circuit), and a communication and timing control unit 20. The horizontal transfer unit 11 starts column scanning in response to a control signal CN2 from the communication and timing control unit 20, instructs a column position of data to be read during a data transfer operation, and transfers pixel data acquired by the column unit 26 in a horizontal direction. The vertical scanning unit 14 has a vertical address setting unit 14a or a vertical driving unit 14b for controlling a row address or a row scanning. The vertical scanning unit 14 selects a row of the pixel array unit 10, supplies a pulse for the row, and starts row scanning in response to a control signal CN1 from the communication and timing control unit 20. The vertical address setting unit 14a also selects a row for an electronic shutter in addition to a signal readout row (readout row: also called a selection row or a signal output row).

The horizontal transfer unit 11 can perform readout process of a portion in the horizontal direction for horizontally transferring only pixel data of pixels (column) of a portion in the horizontal direction in addition to a typical readout process for horizontally transferring data of entire pixels in the horizontal direction. The horizontal transfer unit 11 has a horizontal scanning unit 12 (column scanning circuit) for realizing a control circuit function for sequentially reading the signal of the pixel array unit 10. The horizontal scanning unit 12, for example, has a horizontal address setting unit 12a or a horizontal driving unit 12b controlling column addresses or column scanning so as to indicate the column position of data to be read during the data transfer operation.

The unit pixel 3 is connected to the vertical scanning unit 14 through a row control line 15 for selecting a row, and to the AD conversion unit 250 that is installed for each vertical column of the column unit 26 through a vertical signal line 19. A row control line 15 shows the overall wires that enter into the pixel from the vertical scanning unit 14.

The communication and timing control unit 20 includes a function block of a timing generator (an example of a readout address control device) that supplies a clock that is synchronized with a master clock CLK0 input through a terminal 5a to respective units in the device (the horizontal transfer unit 11, the vertical scanning unit 14, the column unit 26, and the like). Further, the communication and timing control unit 20 includes a function block of a communication interface which receives the master clock CLK0 supplied from an external main control unit through the terminal 5a, receives data for indicating an operation mode or the like supplied from the external main control unit through a terminal 5b, and outputs data including information of the solid-state imaging device 1 to the external main control unit. For example, the communication and timing control unit 20 includes a clock conversion unit 20a having a function of a clock conversion unit generating an internal clock and a system control unit 20b having a communication function and a function of controlling respective units. The clock conversion unit 20a has a built-in multiplier circuit that generates a higher-frequency pulse than the master clock CLK0 based on the master clock CLK0 input through the terminal 5a, and generates internal clocks such as a count clock CKcnt1 and a count clock CKdac1.

The output unit 28 includes a signal amplifying unit 402 (sense amplifier S•A) and a digital interface unit 406 (DIF) having an interface function between the solid-state imaging device 1 and an outside. The signal amplifying unit 402 detects a signal (digital data with a small amplitude) on a horizontal signal line 18 that is a signal line (transfer wire) for data transfer with the horizontal transfer unit 11. The output unit 28 may have a digital operation unit 404 (SIG) that is installed between the signal amplifying unit 402 and the digital interface unit 406 to perform various kinds of digital operation processes, if necessary. The digital interface unit 406 is disposed between the signal amplifying unit 402 and an external circuit to achieve an interface function with the external circuit. The output of the digital interface unit 406 is connected to an output terminal 5c, and image data is output to a subsequent circuit through the output terminal.

[Details of Column AD Circuit and Reference Signal Generation Unit]

As AD conversion methods in the AD conversion unit 250, various methods have been considered from the viewpoint of circuit scale, processing speed (speeding up) or resolution. As an example, an AD conversion method that is called a reference signal comparison type, a slope integration type, or a lamp signal comparison type, is adopted. This method has the characteristic that AD converters can be realized with a simple configuration and even if they are installed in parallel, the circuit scale is not increased. In the reference signal comparison type AD conversion, a count operation effective period Ten is determined (here, a count enable signal EN that indicates the period) based on time taken from a conversion start (start of comparison process) to a conversion end (end of comparison process), and the signal to be processed is converted into digital data based on the number of clocks in the period.

Information obtained through the comparison process is pulse information having time information that corresponds to the size of an analog signal (here, pixel signal voltage Vx). In the reference signal comparison type AD conversion process, an effective period of a counting process is determined based on the pulse information (time information) obtained through the comparison process, and the counting process for changing the value at a constant rate in the effective period of the counting process is performed. As a typical example, a counter is used, and the least significant digit is changed one by one in one reference clock period. The counted value obtained through this is acquired as digital data according to the size of an analog signal. Of course, a counting process for changing the value at a constant rate may be performed, and the configuration is not limited to the configuration using the counter, but various modifications can be made. For example, a cyclic configuration may be provided using a data maintenance unit (latch) that maintains the results of an adder or a subtractor in the reference clock period to make the changed values at a constant rate (1 in the typical example) each time.

In the case of adopting a reference signal comparison type AD conversion method, it may be considered that the reference signal generation unit 27 is installed in each AD conversion unit 250. For example, a comparator and a reference signal generator are installed for each AD conversion unit 250 to change the reference signal value through the reference signal generator of the corresponding column in order on the basis of the comparison result of the comparator. However, this causes the circuit scale and the power consumption to be increased. In this embodiment, a configuration that commonly uses the reference signal generation unit 27 with respect to all AD conversion units 250 is adopted, and the reference signal SLP_ADC that is generated from the reference signal generation unit 27 is commonly used in the respective AD conversion units 250.

Because of this, the reference signal generation unit 27, which has a DA conversion unit 270 (DAC: Digital Analog Converter), synchronizes the initial value that is indicated by control data CN4 from the communication and timing control unit 20 with a count clock CKdac1, and generates a reference signal SLP_ADC having a slope (rate of change) that is indicated by the control data CN4. The count clock CKdac1 may be set to be equal to the count clock CKcnt1 for a counting process performed by the count unit 254. It is sufficient if the reference signal SLP_ADC has a waveform that is linearly changed with a certain overall slope, and the change may appear on a smooth slope or may be a stepwise sequential change.

In the reference signal comparison type AD conversion, a count operation effective period Ten (a signal that indicates the period is called a count enable signal EN) is determined based on the result of comparison between the reference signal SLP_ADC through the comparison unit 252 and the pixel signal voltage Vx, and the analog signal to be processed is converted into digital data based on the number of clocks of the count clock CKcnt1 in a period where the count enable signal EN is active. The process of the reference level (reset level Srst) is called the process of a precharge phase (may be referred to as a P phase for short), and the process of the signal level Ssig is called the process of a data phase (may be referred to as a D phase for short). In the case of performing the D phase process after the P phase process, the D phase process becomes the process of the signal level Ssig that is obtained by adding the signal component Vsig to the reset level Srst. As the count operation effective period Ten, there are a former half counting method in which counting is performed until the comparison output of the P phase and the D phase is inverted, a latter half counting method in which counting is performed after the comparison output of the P phase and the D phase is inverted, and a former and latter half counting method in which one side of the P phase and the D phase performs counting until the comparison output is inverted and the other side of the P phase and the D phase performs counting after the comparison output is inverted. Further, in each case, by skillfully combining P phase and D phase count modes or controlling an initial value setting at a start of the P phase process, the CDS process may be performed in the column. The inventors have proposed various reference signal comparison type AD conversion methods, such as how to obtain the count operation effective period, whether or not the differential process (CDS process) is performed in the AD conversion unit 250, and the like, and they can be basically adopted as embodiments to be described later. As an example, FIG. 2 is an operation timing chart of a reference signal comparison type AD conversion method.

In any processing example, in principle, a reference signal SLP_ADC is supplied to a voltage comparator, and an analog pixel signal input through a vertical signal line 19 and the reference signal SLP_ADC are compared with each other. In the count operation effective period Ten, the counting of a clock signal starts, and AD conversion is performed through counting of the number of clocks in the designated count operation effective period Ten.

In order to perform reference signal comparison type AD conversion, the AD conversion unit 250 of each column of the column unit 26 according to this embodiment includes a comparison processing unit 322 (COMP: voltage comparison unit, comparator), a counter control signal generation unit 332 (EN generation unit), and a count processing unit 351. In the column unit 26 according to this embodiment, the count operation period control unit 253 (counter control signal generation unit 332) is arranged between the comparison unit 252 (comparison processing unit 322) and the count unit 254 (count processing unit 351). Preferably, the count processing unit 351 can switch an up-count mode and a down-count mode (up-down counter). Using this up-down counter, high-frame rate can be achieved without enlarging the circuit scale. A set of comparison processing units 322 of the respective AD conversion units 250 constitutes the comparison unit 252. A set of counter control signal generation units 332 of the respective AD conversion units 250 constitutes the count operation period control unit 253. A set of count processing units 352 of the respective AD conversion units 250 constitutes the count unit 254.

The comparison unit 252 (comparison processing unit 322) compares the reference signal SLP_ADC generated by the reference signal generation unit 27 (DA conversion unit 270) with an analog pixel signal voltage Vx that can be obtained from the unit pixel 3 of the selected row through the vertical signal lines 19 (H1, H2, . . . , and Hh). When the reference signal SLP_ADC coincides with the pixel signal voltage Vx, the comparison processing unit 322 reverses the comparison pulse Co (comparator output).

The counter control signal generation unit 332 of the count operation period control unit 253 generates a count enable signal EN based on the comparison output Co and the control information from the communication and timing control unit 20 to supply the generated count enable signal EN to the count processing unit 351, and controls the count operation period of the count processing unit 351. Here, according to the feature of the configuration according to the present disclosure, column stop signals $CLMSTP_n$ (the details of which will be described later) for controlling on/off of the count operation period control are input by columns to the counter control signal generation unit 332. Since the count operation period control function of unselected columns on which the horizontal transfer of pixel data is unnecessary is stopped, reduction of the power consumption is sought.

From the communication and timing control unit 20 to the count processing unit 351 of each AD conversion unit 250, a control signal CN5 for instructing control information, such as whether the count processing unit 351 performs count process of P phase and D phase in a down-count mode or in an up-count mode, and setting of an initial value Dini or reset process in the count process of P phase, is input.

The reference signal SLP_ADC that is generated by the reference signal generation unit 27 is commonly input to one input terminal (+) of the comparison processing unit 322 and an input terminal (+) of another comparison processing unit 322. The other input terminals (−) of the comparison processing unit 322 are connected to the vertical signal lines 19 of the corresponding vertical columns, and the pixel signal voltage Vx from the pixel array unit 10 is input thereto.

The count clock CKcnt1 from the communication and timing control unit 20 is commonly input to the clock terminal CK of the count processing unit 351 and the clock terminal CK of another count processing unit 351. The count processing unit 351 has a latch function that maintains the count result.

Outputs of the respective AD conversion units 250 (specifically, count processing units 351 of the count unit 254) are connected to the horizontal transfer unit 11. Further, at the rear end of the count processing unit 351, which makes pipeline horizontal transfer possible, a configuration which is provided with a data storage unit as a memory device that has a latch for maintaining the count result of the count processing unit 351 may be adopted. The latch maintains and stores count data output from the count processing unit 351 at the determined timing. The pipeline horizontal transfer is a process of performing a column process (AD conversion or CDS process) in the AD conversion unit 250 and horizontal transfer of the pixel data in parallel.

For example, in an example illustrated in FIG. 2, the counter unit 254 starts down count from an initial value of "0" as a P-phase count operation. That is, the counter unit 254 starts count process in a negative (−) direction. The voltage comparison unit 252 compares the reference signal SLP_AD from the reference signal generation unit 27 with the pixel signal voltage Vx input through the vertical signal line 19, and when both voltages become equal to each other, the voltage comparison unit 252 inverts a comparator output from H level to L level. In response to this result, the counter unit 254 stops the count operation almost simultaneously with the reversal of the comparator output, and latches (maintains and stores) the count value (taking into account the sign, "−Drst") at that time point as the pixel data to complete the AD conversion. If a predetermined down count period elapses, the communication and timing control unit 20 makes the data maintenance control pulse HLDC active H (t14). Through this, the reference signal generation unit 27 stops the generation of the reference signal SLP_AD (t14), and returns to the initial voltage SLP_ini. During the P phase process, since the voltage comparison unit 252 detects the reset level Vrst of the pixel signal voltage Vx and the counter unit 254 performs the count operation, the reset level Vrst of the unit pixel 3 is read and the AD conversion of the reset level Vrst is performed.

In continuation, during the signal acquisition of data phase (D phase) that is the AD conversion period of the signal level Ssig, the signal component Vsig according to the incident light quantity for each unit pixel 3 is read in addition to the reset level Vrst, and the same operation as the P phase readout is performed. That is, the communication and timing control unit 20 first sets the counter unit 254 in an up-count mode by making the count mode control signal UD at high level (t16). At this time, in the unit pixel 3, the signal level Ssig is read to the vertical signal line 19 by making the transfer signal active H in a state where the vertical selection signal of the row Vn to be read is in an active state H (t18 to t19). When the signal level Ssig on the vertical signal line 19 (H1, H2, . . . ) converges and becomes stable, the communication and timing control unit 20 uses the data maintenance control pulse HLDC as the control data CN4 and makes the data maintenance control pulse HLDC inactive L so as to begin to change the reference signal SLP_AD simultaneously with the start of the count operation in the counter unit 254 (t20). Accordingly, the reference signal generation unit 27 inputs a stepwise or linear-shaped voltage waveform, which has a time-varied sawtooth shape (RAMP shape) and has the same slope as the P phase as a whole, starting from the initial voltage SLP_ini, as the reference signal SLP_AD that is a comparison voltage input to one input terminal RAMP of the voltage comparison unit 252. The voltage comparison unit 252 compares the reference signal SLP_AD with the pixel signal voltage Vx of the vertical signal line 19 that is supplied from the pixel array unit 10. Simultaneously with the input of the reference signal SLP_AD to the input terminal RMAP of the voltage comparator 252, the comparison time in the voltage comparison unit 252 is synchronized with the reference signal SLP_AD that is generated from the reference signal generation unit 27, and the measurement is made by the counter unit 254 arranged in each row. As the D phase count operation, the counter unit 254 reads the P phase, and starts up-count, which is contrary to the P phase count operation, from the digital value Drst (here, negative (−) value) of the reset level Srst of the pixel signal voltage Vx that is acquired during the AD conversion. That is, the count process in the positive (+) direction starts.

The voltage comparison unit 252 compares the reference signal SLP_AD from the reference signal generation unit 27 with the pixel signal voltage Vx input through the vertical signal line 19, and when both voltages become equal to each other, the voltage comparison unit 252 inverts the comparator output from H level to L level (t22). In response to this result, the counter unit 254 stops the count operation almost simultaneously with the reversal of the comparator output, and latches (maintains and stores) the count value at that time point as the pixel data to complete the AD conversion (t22). By counting the width of the active low (L) pulse signal having a size in the time axis direction, which is obtained through the comparison process performed by the voltage comparison unit 252, with the count clock CKcnt1, a count value that corresponds to the signal level Ssig in the pixel signal voltage Vx is obtained. If the predetermined up count period elapses, in the unit pixel 3, the output of the pixel signal to the vertical signal line 19 is prohibited by making the vertical selection signal of the row Vn to be read inactive L, and the vertical selection signal is made active H with respect to the next row Vn+1 to be read (t26). At this time, the communication and timing control unit 20 prepares for the processing of the next row Vn+1 to be read. For example, the communication and timing control unit 20 sets the counter unit 254 in up/down count mode by making the count mode control signal UD at low level. During the D phase process, since the voltage comparison unit 252 detects the signal level Ssig of the pixel signal voltage Vx to perform the count operation, the signal component Vsig of the unit pixel 3 is read and the AD conversion of the signal level Ssig is performed.

Here, since the signal level Ssig is the level that is obtained by adding the signal component Vsig to the reset level Srst, the count value of the result of AD conversion of the signal level Ssig is basically "Drst+Dsig". However, since the up-count start point is "−Drst" that is the result of AD conversion of the reset level Srst, the actually maintained count value becomes "−Drst+(Dsig+Drst)=Dsig".

That is, in this embodiment, since the counter unit 254 performs down count during the P phase processing and performs up count during the D phase processing, differential process (subtraction process) between the count value "−Drst" that is the result of AD conversion of the reset level Srst and the count value "Drst+Dsig" that is the result of AD conversion of the signal level Ssig is automatically performed in the counter unit 254, and the count value Dsig according to the result of the differential process is maintained in the counter unit 254. The count value Dsig according to the result of the differential process, which is maintained in the counter unit 254, follows the signal component Vsig.

As described above, by the differential process in the counter unit 254 through the twice readout and the count process, such as the down count during the P phase process and the up count during the D phase process, the reset level Vrst that includes the difference for each unit pixel 3 can be removed, and the result of AD conversion of only the signal component Vsig according to the incident light quantity for each unit pixel 3 can be acquired through a simple and easy configuration. Accordingly, the column AD circuit 25 in this embodiment operates as not only a digital conversion unit that converts the analog pixel signal into digital pixel data but also a CDS (Correlated Double Sampling) process function unit. If a data storage unit is provided at the rear end of the counter unit 254, the count result of the previous row Hx-1 can be transferred to the data storage unit based on the memory transfer instruction pulse from the communication and timing control unit 20 before the operation of the counter unit 254. That is, after completion of the AD conversion period, the data in the counter unit 254 is saved to the data storage unit, and the column AD circuit 25 starts the AD conversion of the next row Vx+1. Data in the data storage unit can be sequentially selected by the horizontal scanning circuit 12, and can be read using the output circuit 28.

According to the basic configuration in this embodiment, the count unit 254 (the count processing unit 351 thereof) performs the CDS process. However, the process is not limited thereto. The P-phase data of the reset level Srst and the D-phase data of the signal level Ssig may be individually transferred to the output unit 28, and the CDS process may be performed by a digital operation unit 404 at the rear end of the AD conversion unit 250.

Each element of the drive control unit 7, such as the horizontal transfer unit 11 or the vertical scanning unit 14, is integrally formed in a semiconductor region such as single crystal silicon, together with the pixel array unit 10, to form one chip (installed on the same semiconductor substrate) using a technology such as a semiconductor integrated circuit manufacturing technology, and a solid-state imaging device 1 according to this embodiment is configured. The solid-state imaging device 1 may be in the form of one chip in which each unit is integrally formed on the semiconductor region, or, although not illustrated in the drawing, in the form of a module in which various kinds of signal processing units, such as the pixel array unit 10, the drive control unit 7, the column unit 26, and the like, and an optical system, such as a photographic lens, an optical low-pass filter, an infrared cut filter, and the like, are gathered and packaged to perform an imaging function.

[Basic Operation of Solid-State Imaging Device]

Figure 3:
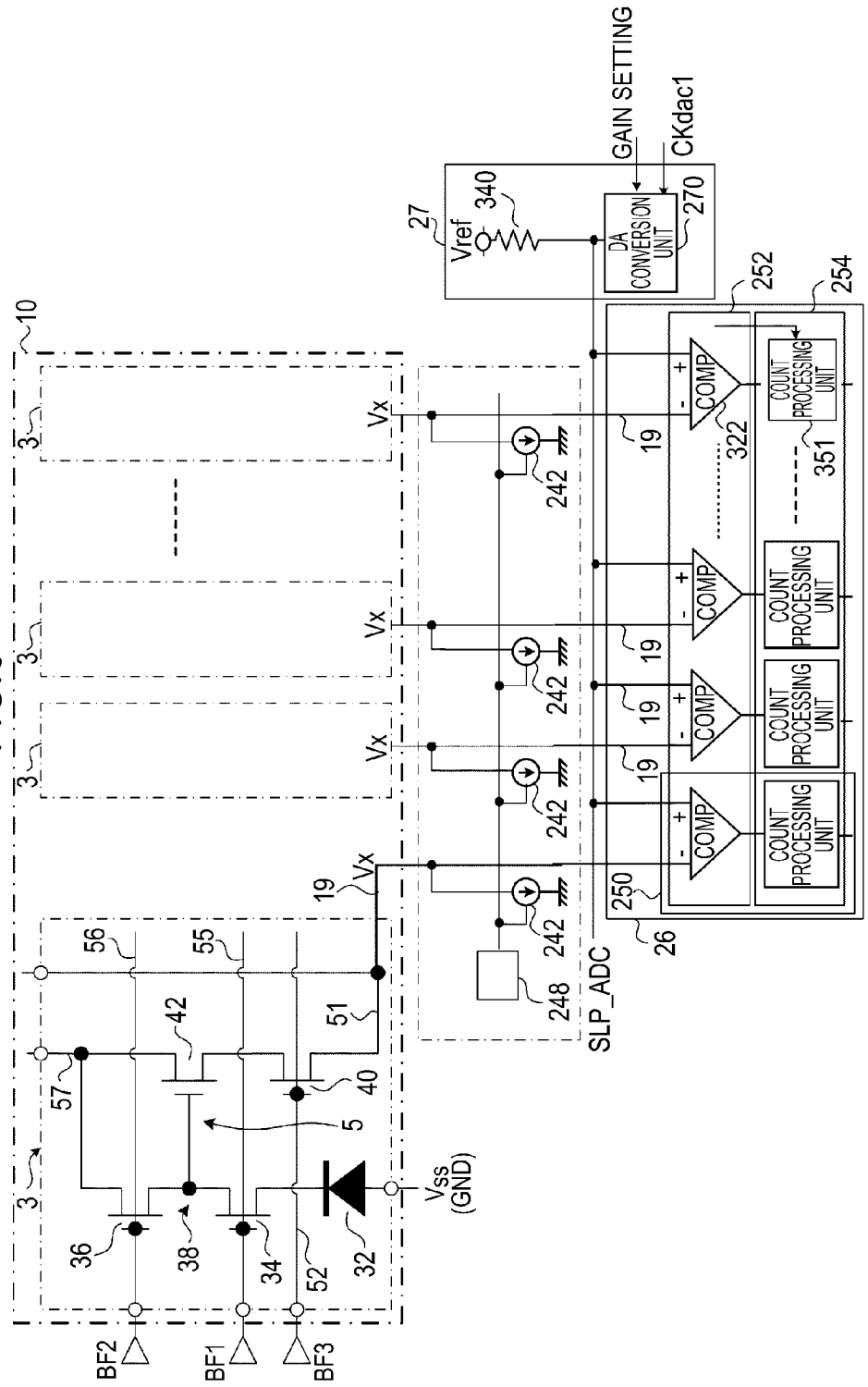
FIG. 3 is a simple circuit diagram of a solid-state imaging device focused on an AD conversion process and a CDS process.

FIG. 3 is a simple circuit diagram of a solid-state imaging device 1 focused on an AD conversion process and a CDS process. In FIG. 3, the count operation period control unit 253 is omitted.

The unit pixel 3 is provided with four transistors as basic elements that constitute the pixel signal generation unit 5, in addition to the charge generation unit 32. The transistors include a readout transistor 34 (constituting the transfer unit), a reset transistor 36, a vertical selection transistor 40, and an amplifying transistor 42. The readout selection transistor 34 that constitutes the transfer unit is driven by a transfer signal TR that is supplied from a transfer drive buffer BF1 to a transfer line 55 (transfer control line). The reset transistor 36 that constitutes an initialization unit is driven by a reset signal RS that is supplied from a reset drive buffer BF2 to a reset line 56 (reset control line). The vertical selection transistor 40 is driven by a vertical selection signal VSEL that is supplied from a row selection drive buffer FB3 to a vertical selection line 52 (selection control line).

The charge generation unit 32 is an example of a detection unit that is composed of a photodetector such as a photodiode. The charge generation unit 32 is configured so that an anode of the photodetector is connected to a reference potential Vss on a low-potential side, and a cathode thereof is connected to a source of the readout selection transistor 34. The reference potential Vss may be a ground potential GND. The readout selection transistor 34 (transfer gate) has a drain that is connected to a connection node at which the reset transistor 36, a floating diffusion 38 (an example of the storage unit), and the amplifying transistor 42 are connected together. The reset transistor 36 has a source that is connected to the floating diffusion 38, and a drain that is connected to a reset power Vrd (typically, common to the power Vdd). The charge that has been generated and maintained in the charge generation unit 32 is read by the pixel signal generation unit 5 (specifically, floating diffusion 38) through turning-on of the readout selection transistor 34), and the maintenance charge amount of the charge generation unit 32 is reduced to that extent. That is, the unit pixel 3 that appears herein becomes a pixel configuration of destructive readout.

The vertical selection transistor 40, for example, has a drain that is connected to a source of the amplifying transistor 42, a source that is connected to a pixel line 51, and a gate (especially, called a vertical selection gate SELV) that is connected to a vertical selection line 52. The amplifying transistor 42 has a gate that is connected to the floating diffusion 38, a drain that is connected to the power Vdd, and the source that is connected to the pixel line 51 through the vertical selection transistor 40. Further the pixel line 51 is connected to the vertical signal line 19. In another connection example, the vertical selection transistor 40 has the drain that is connected to the power Vdd and the source that is connected to the drain of the amplifying transistor 42. Further, the source of the amplifying transistor 42 may be connected to the pixel line 51.

One end of the vertical signal line 19 is extended to the side of the column unit 26, and the readout current source unit 24 is connected to the path thereof. A current source 240 of each column of the operating current supply unit 24 has a load MOS transistor with respect to a vertical column, forms a current mirror circuit of which the gates are connected between a reference current source unit 248 that is commonly used for the respective columns and the load MOS transistor, and functions as a constant current source 242 with respect to the vertical signal line 19. Further, a source follower configuration that supplies substantially constant operating current (readout current) is adopted between the amplifying transistor 42 and the vertical signal line 19.

The reference signal generation unit 27 includes a DA conversion unit 270 and a resistor unit 340. Although not illustrated, the DA conversion unit 270 has a current source unit that is a combination of the constant current source, a counter unit, an offset generation unit, a current source control unit, and a reference current source unit that sets a specified current I_0, and becomes the current output type DA conversion circuit. A resistor unit 340 having a resistance value of R_340 is connected to the current output terminal of the current source unit as the current voltage conversion unit. The current source unit, the current source control unit, and the resistor unit 340 constitute the current voltage conversion unit, and a voltage that is generated at a connection point between the current source unit and the resistor unit 340 is used as the reference signal SLP_ADC.

The vertical signal line 19 of each column is connected to one terminal (in this example, inverting input terminal) of the comparison processing unit 322. Through this, the pixel signal voltage Vx is supplied to the AD conversion unit 250 of the column unit 26 through the vertical signal line 19. In the AD conversion unit 250, the comparison processing unit 322 of the AD conversion unit 250 compares the pixel signal voltage Vx that is read from the unit pixel 3 to the vertical signal line 19 with the reference signal SLP_ADC. Further, a counter control signal generation unit 332 (not illustrated) operates the count processing unit 351 on the basis of the counter enable signal EN, changes the reference signal potential as taking a one-to-one correspondence with the count operation, and converts the pixel signal voltage Vx of the vertical signal line 19 into digital data.

Further, in the unit pixel 3, the configuration of the pixel signal generation unit 5 is not limited to the four transistors as described above, but may be a three-transistor configuration in which the vertical selection transistor 40 is omitted and the amplifying transistor 42 is used both as the vertical selection transistor 40, or a configuration in which the amplifying transistor 42 is shared between plural unit pixels.

<Anti-Blooming Shutter>
[Regarding Blooming Phenomenon]

Figure 4A:
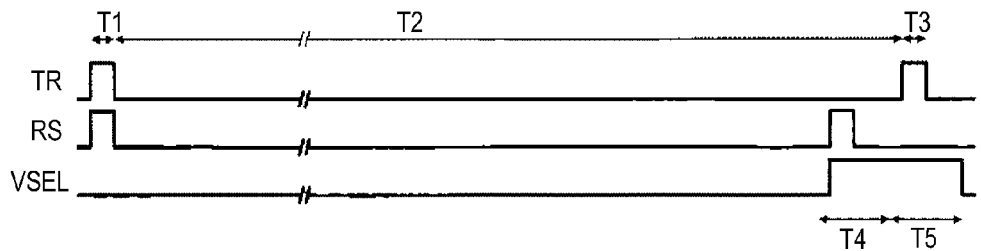
FIGS. 4A to 4E are diagrams explaining a blooming phenomenon.
Figure 4B:
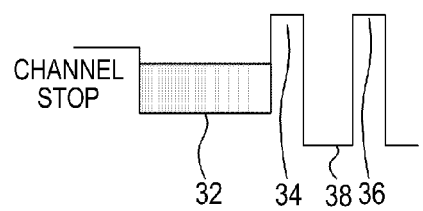
Figure 4C:
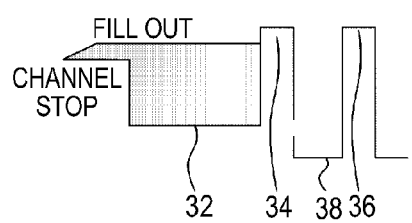
Figure 4D:
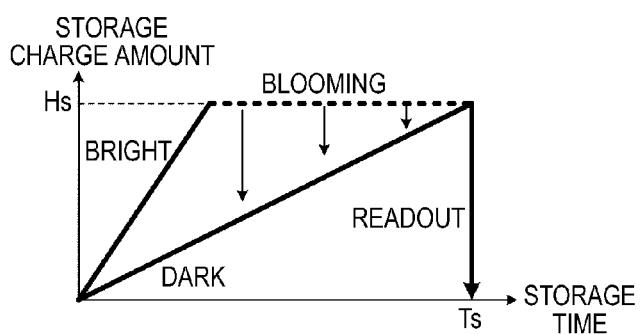
Figure 4E:
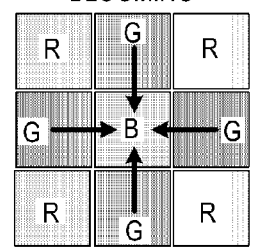

FIGS. 4A to 4E are diagrams explaining a blooming phenomenon. Here, FIG. 4A shows an example of pixel driving timing in the case where anti-blooming according to this embodiment is not adopted (hereinafter referred to as "in the case of typical driving"), FIG. 4B is a diagram explaining potential changes when an incident light quantity is weak, and FIG. 4C is a diagram explaining potential changes when an incident light quantity is strong. P1(D) is a diagram illustrating the relationship between the storage time (exposure time) in this case and the charge amount stored in the charge generation unit 32, and FIG. 4E is a diagram illustrating an example of the blooming phenomenon, in which charge spills over into the adjacent pixels.

As an example, FIG. 4A shows a case of four-TR configuration (no pixel shared) illustrated in FIG. 3. In the typical driving in this case, as illustrated in FIG. 4A, the charge generation unit 32 and the floating diffusion 38 are reset with a predetermined voltage in period T1, and the received light is photoelectrically converted into signal charge (in this example, electrons) in period T2 to be stored in the charge generation unit 32. The floating diffusion 38 is reset in period T4 that is a latter half of period T2, and the voltage of the floating diffusion 38 at this time is read as the reset level. After a predetermined time thereafter, the signal charge, which is stored in the charge generation unit 32 through supply of the transfer pulse TR (active level thereof: in this example, high level) to the gate of the readout selection transistor 34 in period T3, is transferred to the floating diffusion 38, and the voltage of the floating diffusion 38 at this time is read as the signal level in period T5.

In this case, in the specified exposure time in which the incident light quantity is not large enough to saturate the charge generation unit 32 (dark: when the incident light is "weak"), as illustrated in FIG. 4B, the signal charge stored in the charge generation unit 32 does not exceed a storable amount of the charge generation unit 32 during the exposure, and all signal charge is transferred to the floating diffusion 38. If the voltage of the floating diffusion 38 is read as the signal level in period T5, a signal that does not reach the saturation level is read as shown by the solid line in FIG. 4D.

On the other hand, in the specified exposure time in which the incident light quantity is large enough to saturate the charge generation unit 32 (bright: when the incident light is "strong"), as illustrated in FIG. 4C, the signal charge stored in the charge generation unit 32 spills over into during the exposure, and a part thereof spills over into the adjacent pixels. If the voltage of the floating diffusion 38 is read as the signal level in period T5, a signal that has reached the saturation level is read as shown by the dashed line in FIG. 4D.

As illustrated in FIG. 4E, in the pixels that are brighter than the pixels saturated in the storage time in the image sensor, a so-called blooming phenomenon occurs, in which the signal charge exceeds the saturation signal level and spills over into the neighboring pixels. The blooming causes expansion of overexposed area or deterioration of an image quality such as false color. Further, in FIG. 4E, R denotes a red pixel, G denotes a green pixel, and B denotes a blue color.

[Principle of Countermeasures Against Blooming Phenomenon]

Figure 5A:
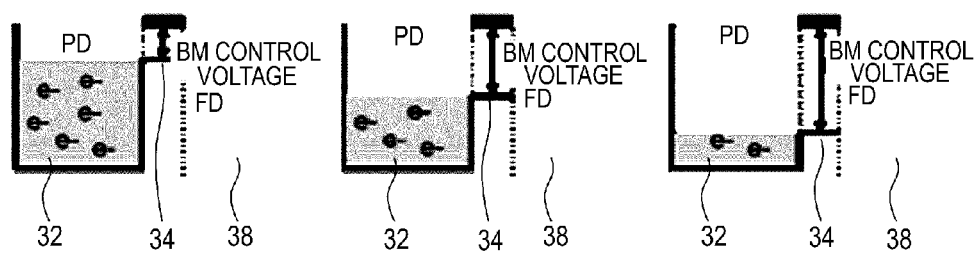
FIGS. 5A and 5B are diagrams (diagrams 1) explaining the principle of countermeasures against a blooming phenomenon.
Figure 5B:
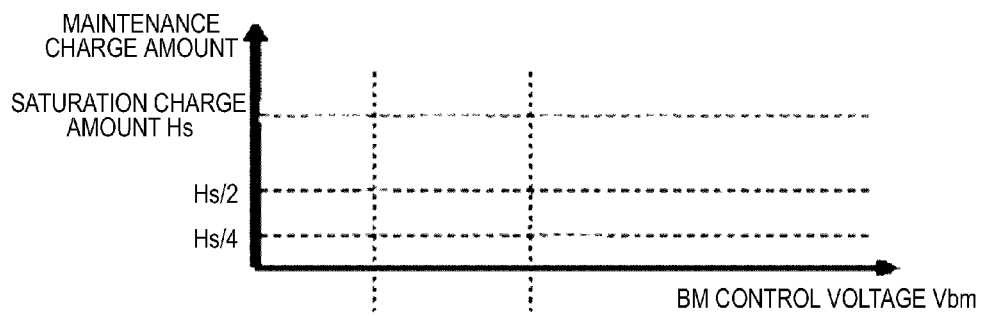

FIGS. 5A, 5B, and 6A to 6D are diagrams explaining the principle of countermeasures against blooming phenomenon. In order to avoid the above-described blooming phenomenon, an electronic shutter using an intermediate voltage is applied to a transfer gate (readout selection transistor 34). A typical sensor is an electronic shutter to which a voltage for turning on the transfer gate (readout selection transistor 34) of binary voltages for turning on/off the transfer gate is given, and ideally, all the charge of the charge generation unit 32 such as a photodiode is transferred (which is called "complete transfer") to the pixel signal generation unit 5 side (for example, floating diffusion 38 area). On the other hand, as illustrated in FIG. 5A, a voltage (which is called an anti-blooming control voltage or a BM control voltage) between binary voltages for turning on/off the transfer gate is given to the transfer gate, and by the electronic shutter to which the BM control voltage is given (which is called an anti-blooming shutter or a BM shutter), as illustrated in FIG. 5B, desired charge can remain in the charge generation unit 32 even after the operation of the corresponding BM shutter).

As is clear from these figures, by the value of the BM control voltage Vbm, as illustrated in FIG. 5A, different amounts of charge can be stored in the charge generation unit 32. Further, as the BM control voltage Vbm becomes higher, the amount of stored charge becomes larger, while as the BM control voltage Vbm becomes lower, the amount of stored charge becomes smaller. On the other hand, it is possible for the charge generation unit 32 to have a margin of exposure as much as the charge amount that is discharged to the floating diffusion 38 by the BM shutter until it is saturated by the subsequent exposure. Thereafter, typical on-voltage is finally supplied to the transfer gate through continuous exposure, and the complete transfer is performed to read the signal. By reducing excessive charge by the BM shutter with respect to an ideal signal, a high-resolution sensor having a reduced blooming amount can be realized. The blooming is avoided by performing a shutter operation through setting of the BM control voltage and pulling out the extra charge from the pixel that is brighter than the saturated pixel.

Figure 6A:
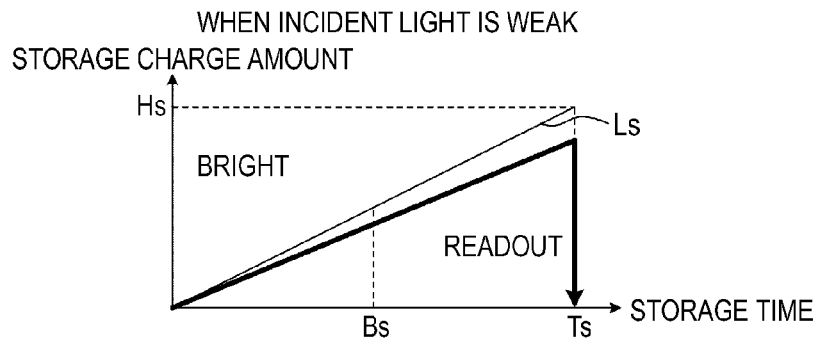
FIGS. 6A to 6D are diagrams (diagrams 2) explaining the principle of countermeasures against a blooming phenomenon.

For example, FIG. 6A shows a case where the incident light is weak and the signal charge does not reach the saturation charge amount at a storage time Ts. In this case, if the BM shutter is applied, the signal charge amount stored in the charge generation unit 32 does not reach the amount which exceeds the potential of the transfer gate due to the application of the BM control voltage Vbm, and the generated and stored charge is discharged to the floating diffusion 38 (is not transferred). Thereafter, by continuing the exposure, after the BM shutter, the signal charge is continuously stored. At last, a typical shutter (complete transfer) operation is performed to read the signal. Through doing this, dark signals can be read properly.

Figure 6B:
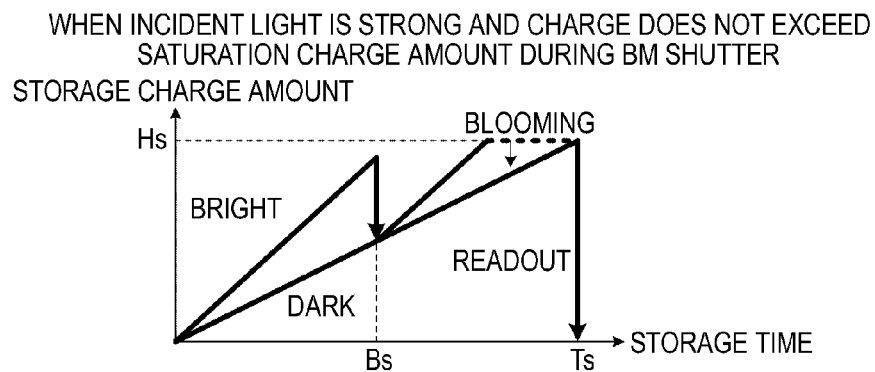

FIG. 6B shows a case where the incident light is strong, and the signal charge that is stored in the charge generation unit 32 is large enough to reach the saturation charge amount Hs at a storage time Ts, but if the BM shutter is applied on the way, the signal charge does not still reach the saturation level. In this case, if the BM shutter is applied, part of the signal charge that is stored in the charge generation unit 32 is discharged (transferred) to the floating diffusion 38 over the potential of the transfer gate due to the application of the BM control voltage Vbm, and the amount that corresponds to the BM control voltage Vbm remains in the charge generation unit 32. Thereafter, by continuing the exposure, after the BM shutter, the signal charge is continuously stored from the amount that corresponds to the BM control voltage Vbm. At last, a typical shutter (complete transfer) operation is performed to read the signal. Through doing this, excessive charge can be reduced by the BM shutter with respect to an ideal signal, and a high-resolution sensor having a reduced blooming amount can be realized.

Figure 6C:
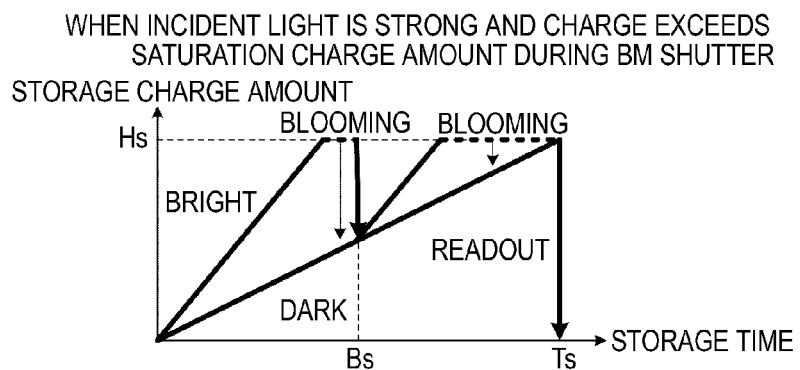

FIG. 6C shows a case where the incident light is very strong, and the signal charge that is stored in the charge generation unit 32 is very large, but if the BM shutter is applied, the signal charge has already reached the saturation level. In this case, before the BM shutter is applied, the signal charge that is stored in the charge generation unit 32 exceeds the saturation level and spills over into the neighboring pixels (overflows), and thereafter, the operation as illustrated in FIG. 6B is performed. Even in this case, the charge amount that overflows the adjacent pixels becomes smaller than that in the case where the BM shutter is not applied, and thus the blooming is suppressed.

Figure 6D:
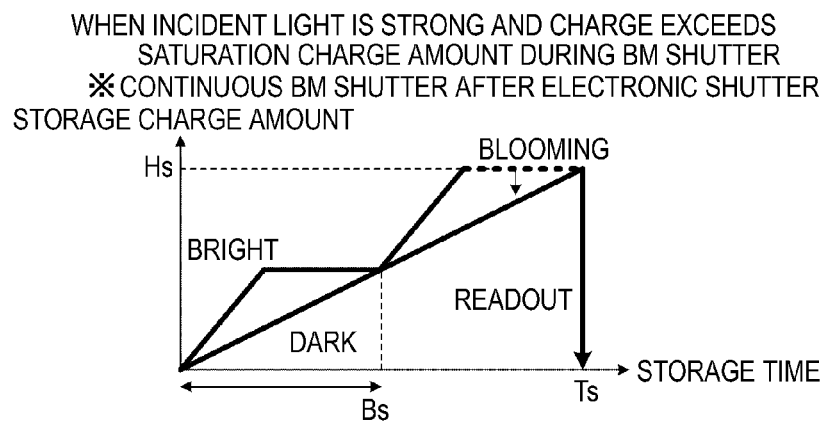

FIG. 6D shows an aspect to prevent the overflow before the BM shutter in FIG. 6C. The BM control voltage Vbm is continuously applied to the transfer gate in a period taken from the time point after the electronic shutter to the BM shutter time point of FIG. 6C. That is, after the electronic shutter, the BM shutter is continuously applied until the BM shutter time point in FIG. 6C. Through doing so, in the case where the signal charge that is stored in the charge generation unit 32 exceeds the saturation level before the BM shutter of FIG. 6C is applied, the charge can be discharged to the floating diffusion 38 before the signal charge reaches the saturation charge amount Hs, and thus, does not fill out the neighboring pixels.

As described above, according to the countermeasures against the blooming according to this embodiment, in low light intensity, the signal can be read by complete transfer for a sufficient exposure time without signal deterioration. On the other hand, in high light intensity, the extra amount that exceeds the potential of the transfer gate that corresponds to the BM control voltage Vbm is discharged to the pixel signal generation unit 5 side (floating diffusion 38), a high-resolution image can be provided with the blooming phenomenon suppressed.

The signal charge that is transferred to the floating diffusion 38 by the BM shutter may be left as it is or may be abandoned by the reset operation. Further, it may be read as the signal regardless of whether or not the reset operation is performed. In the latter case, the signal at that time is maintained, and is used to perform expansion process of the dynamic range.

If the incident light is extremely strong, the floating diffusion 38 is full of the charge that is discharged by the BM control voltage Vbm, and overflow phenomenon may occur in the floating diffusion 38. As the countermeasures, it is preferable to spit out the unnecessary charge that is gathered in the floating diffusion 38 to the reset power Vrd side through performing of the reset operation. It is not necessary to perform the reset operation for each BM shutter, and it is sufficient if the reset operation is performed in the appropriate timing. If a depression structure is used as the reset transistor 36, leak current can flow even if the reset transistor 36 in an off state (unselected state). Accordingly, using the feature, the unnecessary charge that is gathered in the floating diffusion 38 can be naturally spitted out to the reset power Vrd before the floating diffusion 38 overflows. In the case of discharging the unnecessary charge to the reset power Vrd using the feature of the reset transistor 36 having the depression structure, if the BM control voltage Vbm becomes closer to the voltage that prescribes the H level, the increase of the unnecessary charge amount becomes faster. Accordingly, the function of discharging the unnecessary charge through the reset transistor 36 may be too late, and thus the floating diffusion 38 may overflow. In order to accurately discharge the unnecessary charge to the reset power Vrd without overflowing the floating diffusion 38, it is preferable that the BM control voltage Vbm be slightly lower than the voltage that prescribes the H level. If the timing of the BM shutter and the setting conditions 1) and 2) of the BM control voltage Vbm are satisfied, this condition is cleared.

<BM Shutter Timing and Control Voltage>
[Basic Setting: BM Control Voltage for Each BM Shutter]

FIGS. 7 to 9B are diagrams explaining the basis of the timing of a BM shutter and setting conditions of the BM control voltage Vbm. This basic setting is a method of setting the BM control voltage Vbm that is optimum for each BM shutter.

Hereinafter, as an assumption, it is defined that a solid-state imaging device 1 reaches the saturation charge amount Hs at a storage time Ts. It is preferable that the saturation charge amount Hs is set to a level that ensure a margin in consideration of variation on a wafer or a screen or variation of an intermediate voltage. To make a driving signal TRG, which is supplied to a transfer gate such as an intermediate shutter for typical readout or blooming suppression, active is called a shutter operation. In particular, the shutter operation related to the prevention of blooming is called an anti-blooming shutter. Further, the total number of shutter operations of the intermediate shutter for typical readout or blooming suppression is set to N. The readout selection transistor 34 is called a transfer gate.

Here, the BM control voltage Vbm that is an example of the anti-blooming voltage may be in the range except for H level and L level in typical binary driving, and in principle, the BM control voltage Vbm may be any voltage level value except for the voltage Vcc_H that prescribes H level and the voltage Vcc_L that prescribes L level. Since the voltage at which charge filling-out during excessive incidence can be transferred to its own floating diffusion 38 side is the BM control voltage Vbm (anti-blooming voltage), it may be a voltage on an active level (H level) side rather than a low voltage that prescribes an inactive level (L level). Further, although a voltage that prescribes H level is permissible, to make the voltage at H level is not good. In this embodiment, the voltage that prescribes H level is not used as the anti-blooming voltage.

First, if the voltage is too close to the voltage Vcc_L that prescribes L level, the anti-blooming effect becomes less, while if the voltage is too close to the voltage Vcc_H that prescribes H level, it is extremely close to a state where the readout selection transistor 34 (transfer gate) is always in an on state. For example, even if the reset transistor 36 has a depression structure, the function of discharging unnecessary charge becomes insufficient, and thus the floating diffusion 38 may overflow.

For example, in order to heighten the conversion efficiency when the signal charge is converted into a voltage signal, it is necessary to lower the capacitance (including parasitic capacitance) of the floating diffusion 38, and for this, the floating diffusion 38 is likely to overflow. At this time, if the discharge capacity to the reset power Vrd through the reset transistor 36 having the depression structure is insufficient, the floating diffusion 38 is likely to overflow.

In consideration of the anti-blooming, the optimum range of the BM control voltage Vbm may be determined to the extent that the unnecessary charge component that spills over into from the charge generation unit 32 is liable to flow to the floating diffusion 38, and even in the case of high exposure, the unnecessary charge component that spills over into from the charge generation unit 32 does not make the floating diffusion 38 overflow. Further, in consideration of the above-described reliability and dark current problems when the reset transistor 36 is always in a turn-on state, it is preferable that the BM control voltage be lower than the voltage Vcc_H and be higher than the voltage Vcc_L. Further details are as follows.

First, with respect to the BM shutter timing and the BM control voltage Vbm, the following setting conditions may be considered.

1) It is preferable that the "charge amount corresponding to the saturation charge amount" (details will be described later) in the BM shutter be a voltage that can be maintained by the charge generation unit 32.

2) In the case of reading the signal during the final complete transfer, it is preferable to set the timing of the final BM shutter, as the saturation level can be read.

Figure 7:
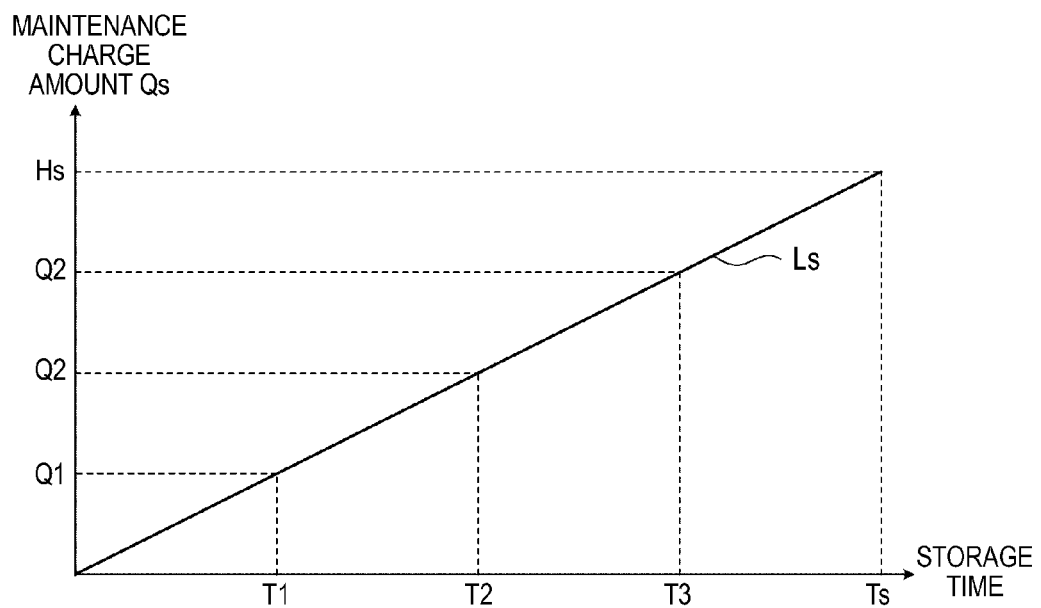
FIG. 7 is a diagram (diagram 1) explaining the basis of BM shutter timing and BM control voltage setting conditions.

In order to satisfy the setting condition 1), the stored charge in each timing may be set as a voltage at which the charge generation unit 32 can maintain the stored charge under conditions that light quantity that reaches the saturation level is incident during the exposure period from the typical electronic shutter to the typical readout (complete transfer). Specifically, if it is assumed that the storage time and the storage charge amount are in a linear relationship, and the charge reaches the saturation charge amount Hs at a storage time Ts, as illustrated in FIG. 7, the charge amount to be maintained in the charge generation unit 32 in the timing in which the BM control voltage Vbm for the BM shutter is applied is prescribed as "the charge amount corresponding to the saturation charge amount" from the straight line Ls that indicates this characteristics. Hereinafter, "the charge amount corresponding to the saturation charge amount" is also called an anti-blooming charge amount or BM charge amount. The BM control voltage Vbm at which the charge generation unit 32 can maintain "the charge amount corresponding to the saturation charge amount" (BM charge amount Qbm) is a voltage that does not exert an influence on an ideal output of the sensor in consideration of the storage time and the saturation signal amount. Accordingly, the applied voltage at which the BM charge amount Qbm can be maintained is determined from the relationship between the applied voltage (BM control voltage Vbm) as illustrated in FIG. 5B and the maintenance charge amount of the charge generation unit 32. Further, with respect to the optimum voltage value for giving "the charge amount corresponding to the saturation charge amount" determined as above, the BM control voltage Vbm is not limited to completely the same, but some errors (for example, several %) may be permitted.

Further, if the BM control voltage Vbm is lower than the voltage at which the BM charge amount Qbm can be maintained regardless of errors, part of the charge generated by the charge generation unit 32 is discharged to the floating diffusion 38 during the BM shutter even in the case of the incident light having an unsaturated level, and thus the signal level that is read during the complete transfer becomes improper. That is, if the BM control voltage Vbm is lower than the voltage at which the BM charge amount Qbm can be maintained, this exerts an influence on the ideal output of the sensor. On the contrary, if the BM control voltage Vbm is slightly higher than the voltage at which the BM charge amount Qbm can be maintained, there is some margin until the charge is discharged to the floating diffusion 38 during the BM shutter. Further, in the case where the setting condition 1) is satisfied, the setting condition 2) is automatically satisfied. This is because in the case of the incident light having a saturation level, the slope of the straight line that indicates the linear relationship between the storage time and the storage charge amount is certainly larger than the slope of the straight line Ls when the charge reaches the saturation charge amount Hs at the storage time Ts.

According to the above description, there is a linear relationship between the storage time and the storage charge amount. However, even in the case where there is no linear relationship, "the charge amount corresponding to the saturation charge amount" during the BM shutter can be obtained from the characteristic curve. Even in this case, the voltage at which the charge generation unit 32 can maintain "the charge amount corresponding to the saturation charge amount" during the BM shutter may be set as the control voltage of the transfer gate.

As described above, the voltage at which the charge generation unit 32 can maintain "the charge amount corresponding to the saturation charge amount" or the charge amount that is slightly larger than that during the BM shutter may be set as the control voltage (that is, BM control voltage Vbm) of the transfer gate.

Figure 8A:
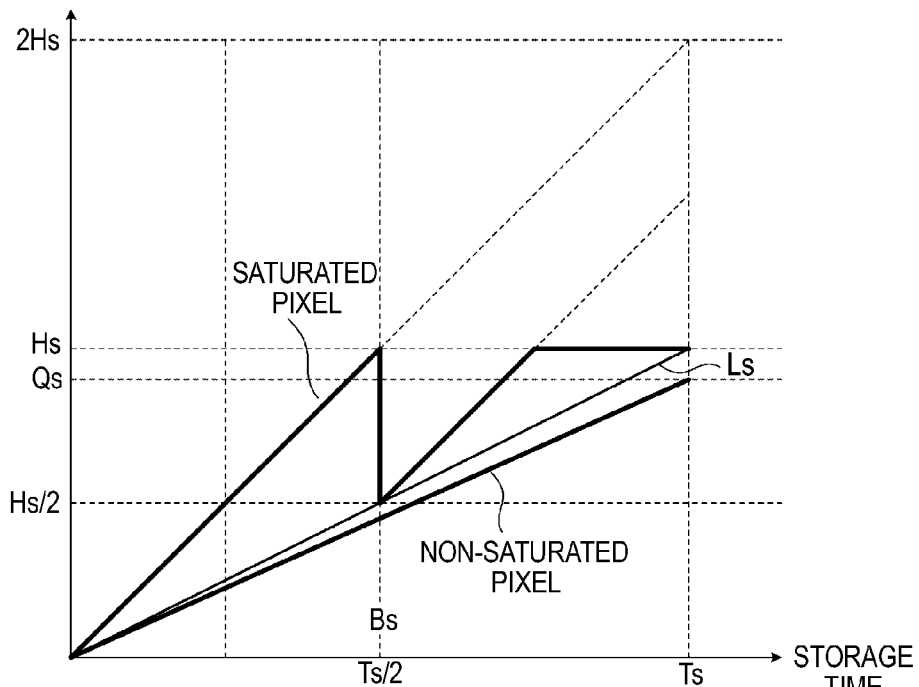
FIGS. 8A to 8C are diagrams (diagrams 2) explaining the basis of BM shutter timing and BM control voltage setting conditions.
Figure 8B:
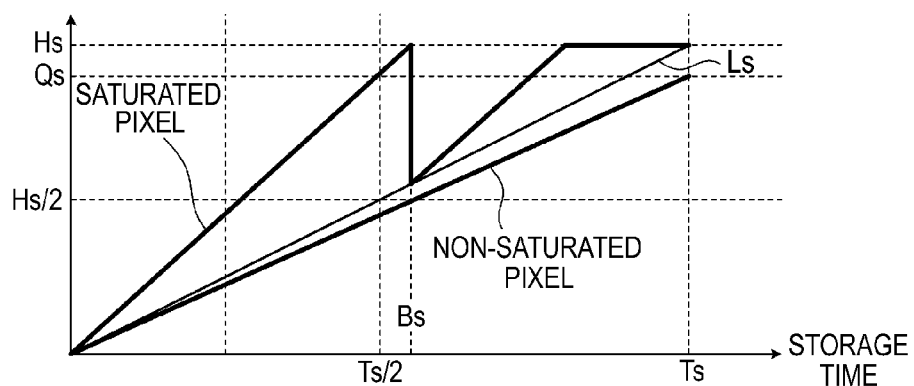
Figure 8C:
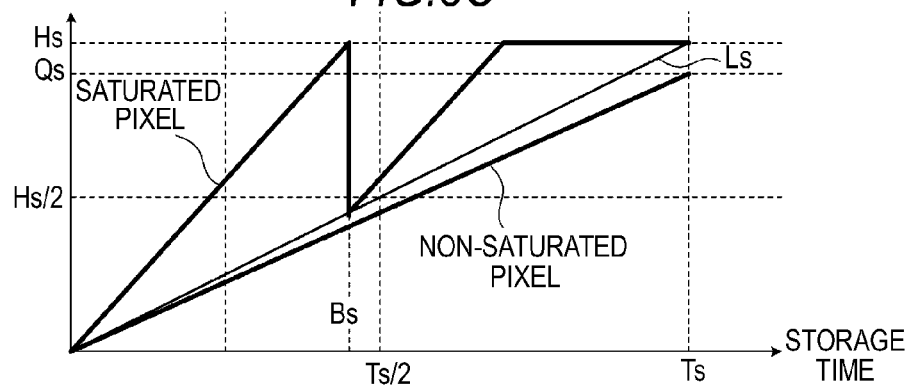

The number of times and the timing the BM shutter is applied may be prescribed from the endurance to the blooming phenomenon. For example, if it is intended to have approximately twice the endurance with respect to the saturation charge amount Hs through once BM shutter, as illustrated in FIG. 8A, the BM shutter may be applied in the timing of Ts/2 such that saturation is not made in the timing of Ts/2. The blooming amount can be reduced, and during the complete transfer, the saturation level can be read. As illustrated in FIG. 8B, in the case of applying the BM shutter later than Ts/2, the blooming endurance becomes approximately Ts/Tbm times (<twice). On the contrary, as illustrated in FIG. 8C, in the case of applying the BM shutter earlier than Ts/2, it may be considered that the blooming endurance is approximately Ts/Tbm times (>twice), but the blooming amount generated after the BM shutter becomes large and Ts/Tbm times the effect may not actually be obtained. In other words, it may be best to have approximately twice the endurance with respect to the saturation charge amount Hs by performing once the BM shutter in the timing of Ts/2.

Further, if the BM shutter is applied in every timing of n×Ts/N (where, n is a positive (+) integer from "1" to "N−1"), approximately N times the endurance may be obtained. That is, as the BM shutter is performed multiple times (accordingly, plural kinds of BM control voltages Vbm are prepared), the anti-blooming effect becomes heightened. N−1 times (N≧2) the BM shutter is applied at time intervals of Ts/N. During the n-th BM shutter, the BM control voltage Vbm is set so that the BM charge amount Qbm that can be maintained by the charge generation unit 32 becomes n×Ts/N at that time. For example, if N=2, the BM shutter is performed at time intervals of Ts/2 so that the charge in the charge generation unit 32 becomes Hs/2. If N=4, the BM shutter is performed at time intervals of Ts/4 so that the charge in the charge generation unit 32 becomes Hs/4, 2×Hs/4, and 3×Hs/4.

Figure 9A:
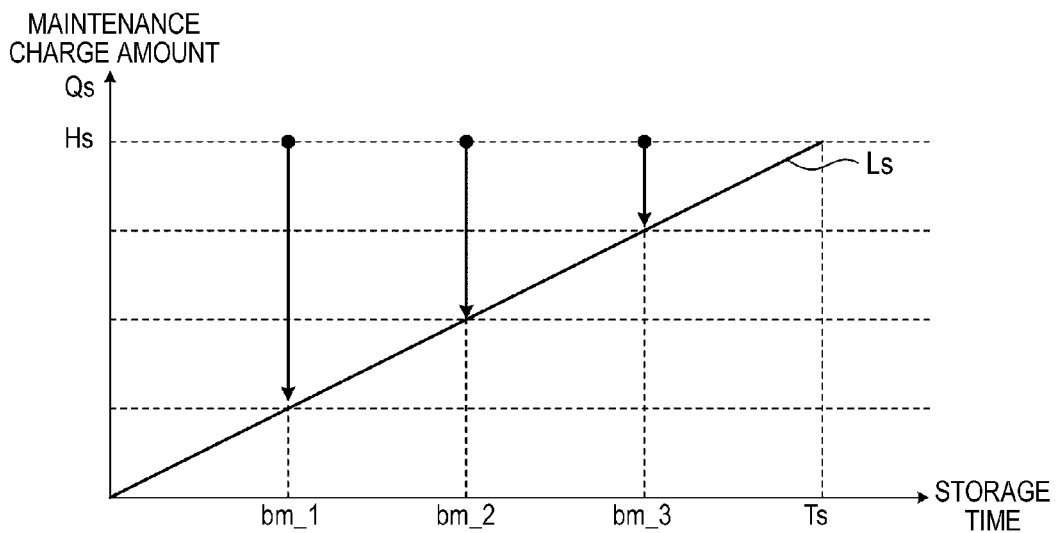
FIGS. 9A and 9B are diagrams (diagrams 3) explaining the basis of BM shutter timing and BM control voltage setting conditions.
Figure 9B:
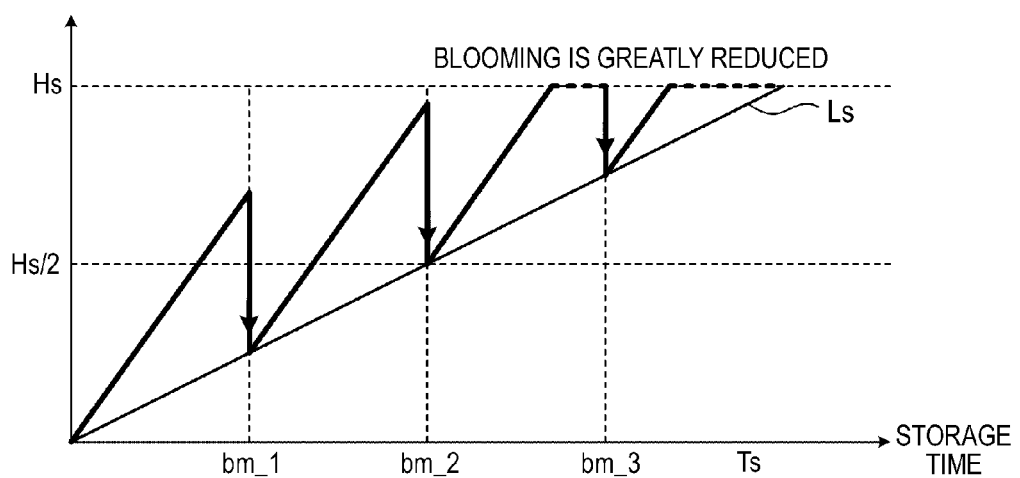

For example, FIGS. 9A and 9B show a case where the BM shutter is performed three times. By the BM shutter the multiple times, as illustrated in FIG. 9A, the charge amount that can be maintained in the charge generation unit 32 is further reduced, and as a result, the blooming amount can be reduced. On the other hand, as illustrated in FIG. 9B, since the pixel has to be saturated and becomes a constant value, the charge amount in the charge generation unit 32 during the readout becomes equal to the case where the BM shutter is not applied, and thus this does not exert an influence on the output of the image sensor. As described above, high-quality image with reduced blooming amount can be realized without exerting an influence on the output.

Modified Example

Common BM Control Voltage

FIGS. 10 and 11 are diagrams explaining a modified example of the setting conditions of BM shutter timing and BM control voltage Vbm. This modified setting is a method of making the BM control voltages Vbm of the BM shutters for each time equal to one another (same voltage value) in the case of performing the BM shutter multiple times. With respect to the BM control voltage Vbm for each time, the "same voltage value" does not mean only a case where the voltage values are completely equal to each other, and there may be some errors in the range of several %.

In the case of performing the BM shutter multiple times, preparing the optimum BM control voltage Vbm requires corresponding voltage setting circuit, and this causes negative effects of chip area and power consumption. As countermeasures, a kind of BM control voltage Vbm is used.

First, as can be understood from FIG. 8C, by applying the BM shutter earlier than Ts/2, the blooming endurance at that time becomes approximately Ts/Tbm times. However, the blooming amount that occurs after the BM shutter is large, and the Ts/Tbm times effects may not be obtained. In order to resolve this, the BM shutter may be additionally applied after the corresponding BM shutter. Through this repetition, BM shutter is applied multiple times. Here, the BM control voltage Vbm during the BM shutter for each time becomes the voltage at which the charge generation unit 32 can maintain "the charge amount corresponding to the saturation charge amount" (BM charge amount Qbm) in the final time BM shutter.

It is examined which timing the final BM shutter may be performed (in other words, how the set value of the BM control voltage Vbm is determined). In the case of performing the BM shutter multiple times, the BM shutter may be applied at equal intervals. However, since charge remains in the charge generation unit 32 after the BM shutter, the charge reaches the saturation earlier in comparison to the case where the complete shutter has been performed. Accordingly, it is not preferable to make the time Tbm_1 taken from after the electronic shutter to once the BM shutter and the BM shutter time interval TBm_x thereafter equal to each other, but it is preferable to determine "Tbm_1<Tbm_x". Accordingly, x is a positive (+) integer that is equal to or larger than "2" and equal to or smaller than "N−1", and Tbm_x is a time interval between the (x-1)-th BM shutter and the x-th BM shutter.

In order to reduce the total number of BM shutters, it is preferable that the BM charge amount Qbm is small. This means that the timing of the final BM shutter is earlier than Ts/2. However, even in this case, as can be understood from FIG. 8C, the blooming amount that occurs after the final BM shutter becomes large. Accordingly, on the point of the whole balance, in the same manner as once the BM shutter, it may be preferable to set Ts/2 as the timing of the final BM shutter. However, in the case where it is possible to increase the number of BM shutters, the timing of the final BM shutter may be set to be later than Ts/2, and the BM charge amount Qbm may be larger than Hs/2. In this case, the time taken from the final BM shutter to the complete transfer can be shortened, and thus the blooming amount can be reduced.

The above points are generalized and illustrated in FIG. 10. In the drawing, it is assumed that the time taken until the charge initially reaches the BM charge amount Qbm after the electronic shutter is Tx (=Tbm_1), and the time taken until the charge reaches the saturation thereafter is a α·Tx. Accordingly, first time BM shutter is applied at a time of (1+α)·Tx (=Tbm_1), and BM shutter is applied M (=N−2) times for each α·Tx. In this case, The BM charge amount Qbm can be represented by Hs/(1+α) from the straight line to the first time BM shutter, and can be represented by {(1+α)+M·α}·Tx·Hs/Ts from the straight line Ls. Through this, (1+α)·{(1+α)+M·α}=Ts/Tx is guided.

For example, as the BM control voltage Vbm, about a half of the saturation charge amount is set as a voltage that remains in the charge generation unit 32. If the number of BM shutter is one, the BM shutter is set at the middle of the storage time. Further, in the case of adding the BM shutter, it is preferable to add a BM shutter to ensure the shutter period that is a half of the period from the initial BM shutter.

Figure 11A:
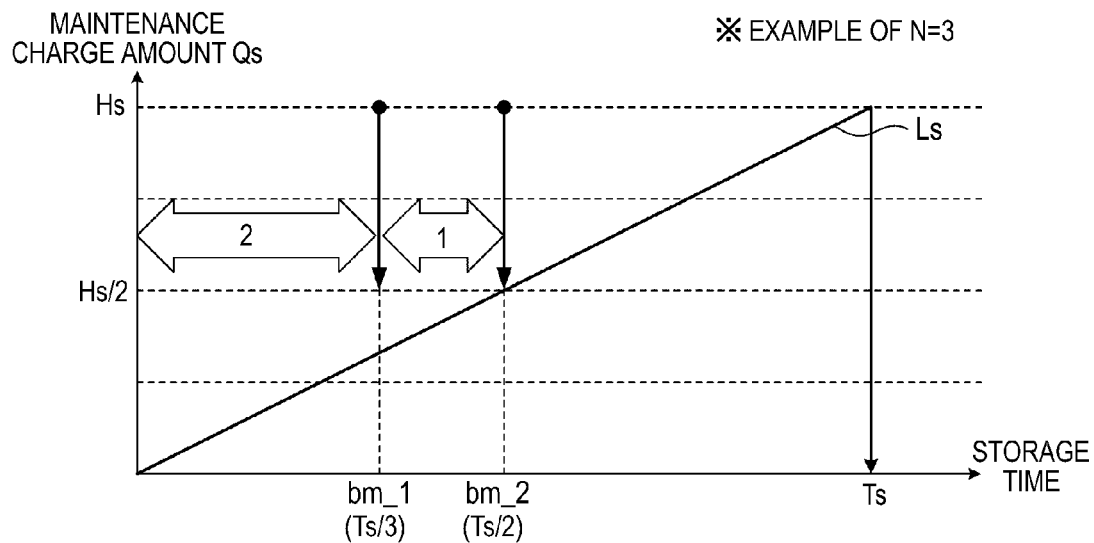
FIGS. 11A and 11B are diagrams (diagrams 2) explaining a modified example of BM shutter timing and BM control voltage setting conditions.
Figure 11B:
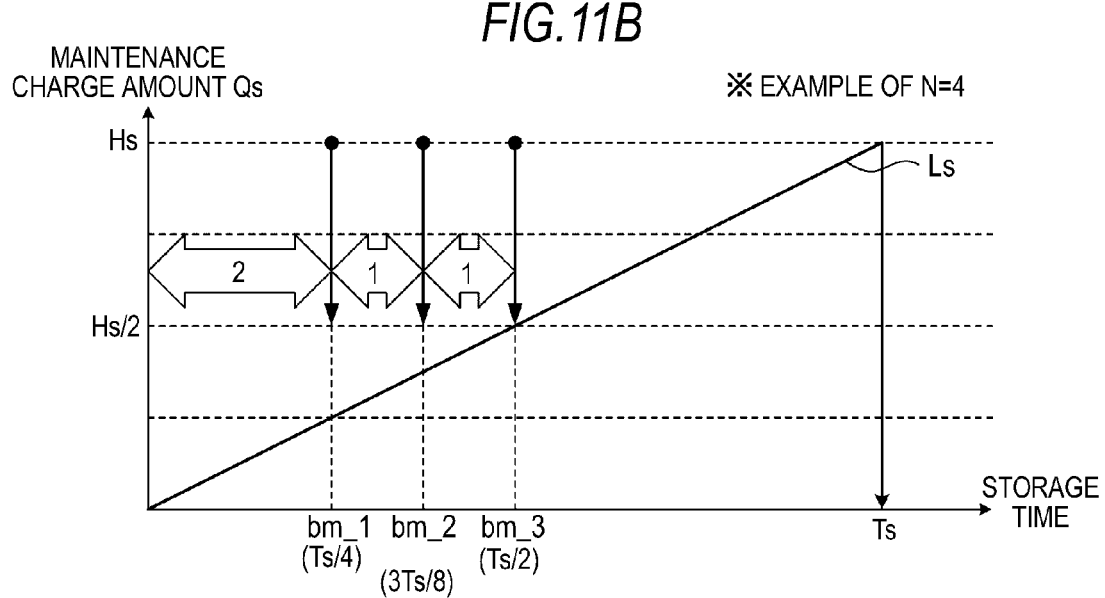

For example, FIG. 11A shows a case where N=3 (M=1), that is, a case where two BM shutters (anti-blooming shutters) are provided. FIG. 11B shows a case where N=4 (M=2), that is, a case where three BM shutters (anti-blooming shutters) are provided. Since a voltage at which about a half of the saturation charge amount remains in the charge generation unit 32 is set as the BM control voltage Vbm, it is determined that α=1, which is obtained from Hs/(1+α)=Hs/2). The BM shutter interval from the electronic shutter to the first time BM shutter is 2·Tx, and the BM shutter interval between the first time and the second time (FIGS. 11A and 11B) and between the second time and the third time (FIG. 11B) is Tx. It can be known that a shutter period that is a half of the period until the initial BM shutter is ensured between the first time and the second time and between the second time and the third time.

Vertical Scanning Unit

First Example

Figure 12:
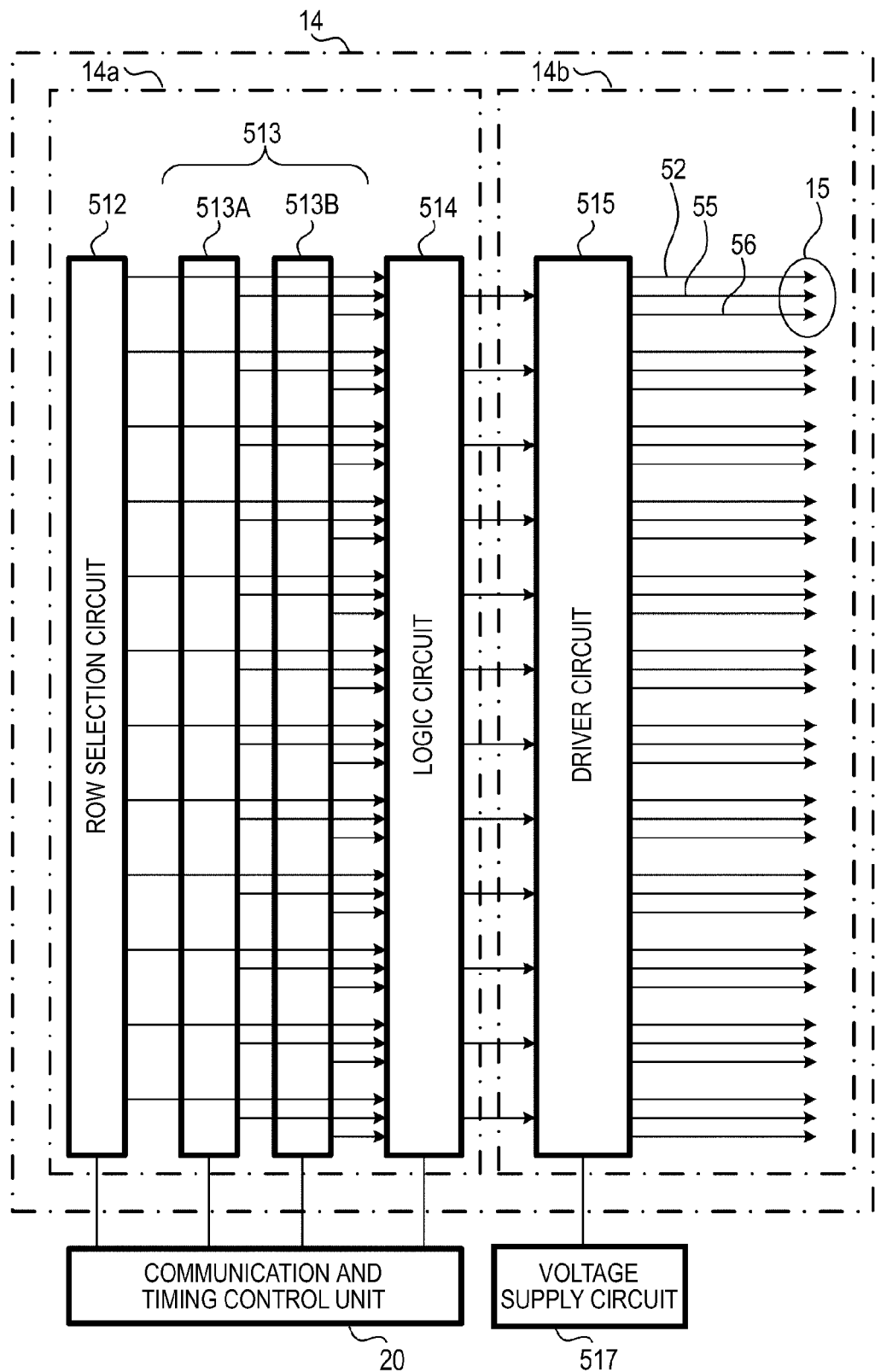
FIG. 12 is a diagram illustrating a first example of a vertical scanning unit.

FIG. 12 is a diagram illustrating a first example of the vertical scanning unit 14. According to the first example, the solid-state imaging device 1 (CMOS image sensor) illustrated in FIG. 1 corresponds to rolling shutter (focal-plane shutter) imaging, which performs reset of a signal by progressively scanning respective unit pixels 3 of the pixel array unit 10 for each pixel row. Specifically, the vertical scanning unit 14 of the first example includes a row selection circuit 512, a preceding selection circuit 513, a logic circuit 514, and a driver circuit 515. The row selection circuit 512, the preceding selection circuit 513, and the logic circuit 514 correspond to the vertical address setting unit 14a, and the driver circuit 515 corresponds to the vertical driving unit 14b.

The row selection circuit 512 corresponds to the first driving unit, is composed of shift registers or address decoders or the like, and under the control of the communication and timing control unit 20, appropriately generates pixel drive pulses, such as a transfer pulse TR, a reset pulse RS, and a vertical selection signal VSEL. The row selection circuit 512 selects the respective unit pixels 3 of the pixel array unit 10 by scanning electronic shutter rows and readout rows in the unit of a row in the vertical direction (upward/downward direction), performs an electronic shutter operation for performing signal sweeping of the unit pixels 3 of the rows with respect to the electronic shutter rows, and performs signal readout operation of the unit pixels 3 of the rows with respect to the readout rows.

Here, although not illustrated, the row selection circuit 512 is configured to have a readout scanning system for reading signals of the respective unit pixels 3 of the readout rows as progressively selecting and scanning the unit pixels 3 in the unit of a row, and an electronic shutter scanning system for performing an electronic shutter operation with respect to the same rows (electronic shutter rows) prior to the readout scanning performed by the readout scanning system for a time corresponding to the shutter speed. The period from the timing in which unnecessary charge of the charge generation unit 32 is reset by the electronic shutter operation through the electronic shutter scanning system to the timing in which the signal of the unit pixel 3 is read by the readout operation through the readout scanning system becomes a storage period (first exposure time) of the signal charge in the unit pixel 3. That is, the electronic shutter operation is an operation which resets (sweeps) the signal charge stored in the charge generation unit 32 and starts to newly store the signal charge after the reset.

The preceding selection circuit 513 corresponds to the second driving unit, is composed of a plurality of row selection circuits, for example, two row selection circuits 513A and 513B, and selectively scans the plural rows (in this example, two rows) at equal intervals prior to the rows selectively scanned and read by the row selection circuit 512. The row selection circuit 513A and the row selection circuit 513B are configured by shift registers, address decoders or the like, are synchronized with the selective scanning of the row selection circuit 512 under the control of the communication and timing control unit 20, and selectively scans the two rows at equal intervals prior to the readout rows that are selectively scanned by the row selection circuit 512 by appropriately generating the transfer pulse TR. In this selective scanning, based on the transfer pulse TR, the signal charge stored in the charge generation unit 32 is transferred to the floating diffusion 38.

The logic circuit 514, under the control of the communication and timing control unit 20, supplies the transfer pulse TR, the reset pulse RS, and the vertical selection signal VSEL, which are output to select the rows from the row selection circuit 512 and two row selection circuits 513A and 513B of the preceding selection circuit 513, to the respective control lines of the pixel array unit 10 through a driver circuit 515, and provides a signal for selecting the voltage value of the transfer pulse TR to the driver circuit 515.

The driver circuit 515 is synchronized with the selective scanning performed by the row selection circuit 512, and supplies the transfer pulse TR, the reset pulse RS, and the vertical selection signal VSEL of the voltage for turning on/off the respective transistors (the readout selection transistor 34, the reset transistor 36, the vertical selection transistor 40) of the unit pixel 3 to the unit pixel 3. Further, the driver circuit 515 is synchronized with the selective scanning preformed by the row selection circuit 513A and the row selection circuit 513B, and supplies the transfer pulse TR of an intermediate voltage (described as intermediate voltage) with respect to the voltage for turning on/off the readout selection transistor 34 to the unit pixel 3. That is, the driver circuit 515 has functions of the first supply voltage control unit, the second supply voltage control unit, and the third supply voltage control unit. In the driver circuit 515, a transfer drive buffer BF1, a reset drive buffer BF2, and a row selection drive buffer BF3 are provided.

Second Example

Figure 13:
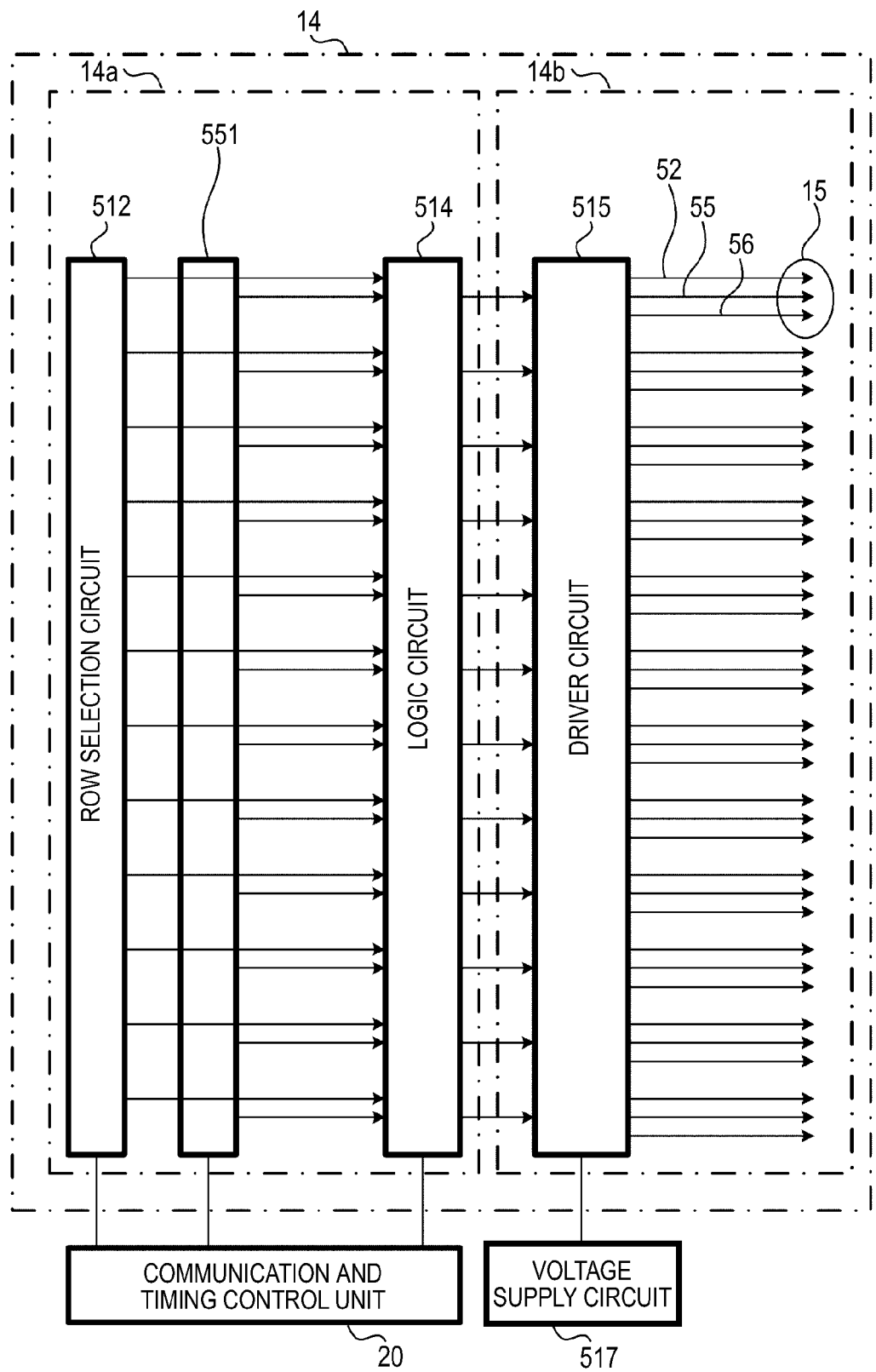
FIG. 13 is a diagram illustrating a second example of a vertical scanning unit.

FIG. 13 is a diagram illustrating a second example of the vertical scanning unit 14. According to the second example, the solid-state imaging device 1 (CMOS image sensor) illustrated in FIG. 1 corresponds to global shutter (electronic shutter for all pixels) imaging, which performs exposure in the same timing with respect to all unit pixels 3 of the pixel array unit 10. In the global shutter, artifact that is caused by the rolling shutter (charge sweeping due to the vertical scanning) does not occur. Specifically, the vertical scanning unit 14 according to the second example is provided with a simultaneous multi-row selection circuit 551 for simultaneously selecting plural rows instead of the preceding selection circuit 513 of FIG. 12. Further, although not illustrated, in order to support the global shutter, a mechanical shutter (hereinafter abbreviated to as "mecha-shutter") is provided at an optical front end of the solid-state imaging device 1. Other configuration is basically the same as that according to the first example. Even in the second example, by setting the BM control voltage Vbm and applying the BM shutter, excessive charge can be reduced with respect to an ideal signal, and a high-quality image sensor having a reduced blooming amount can be realized.

Third Example

Figure 14:
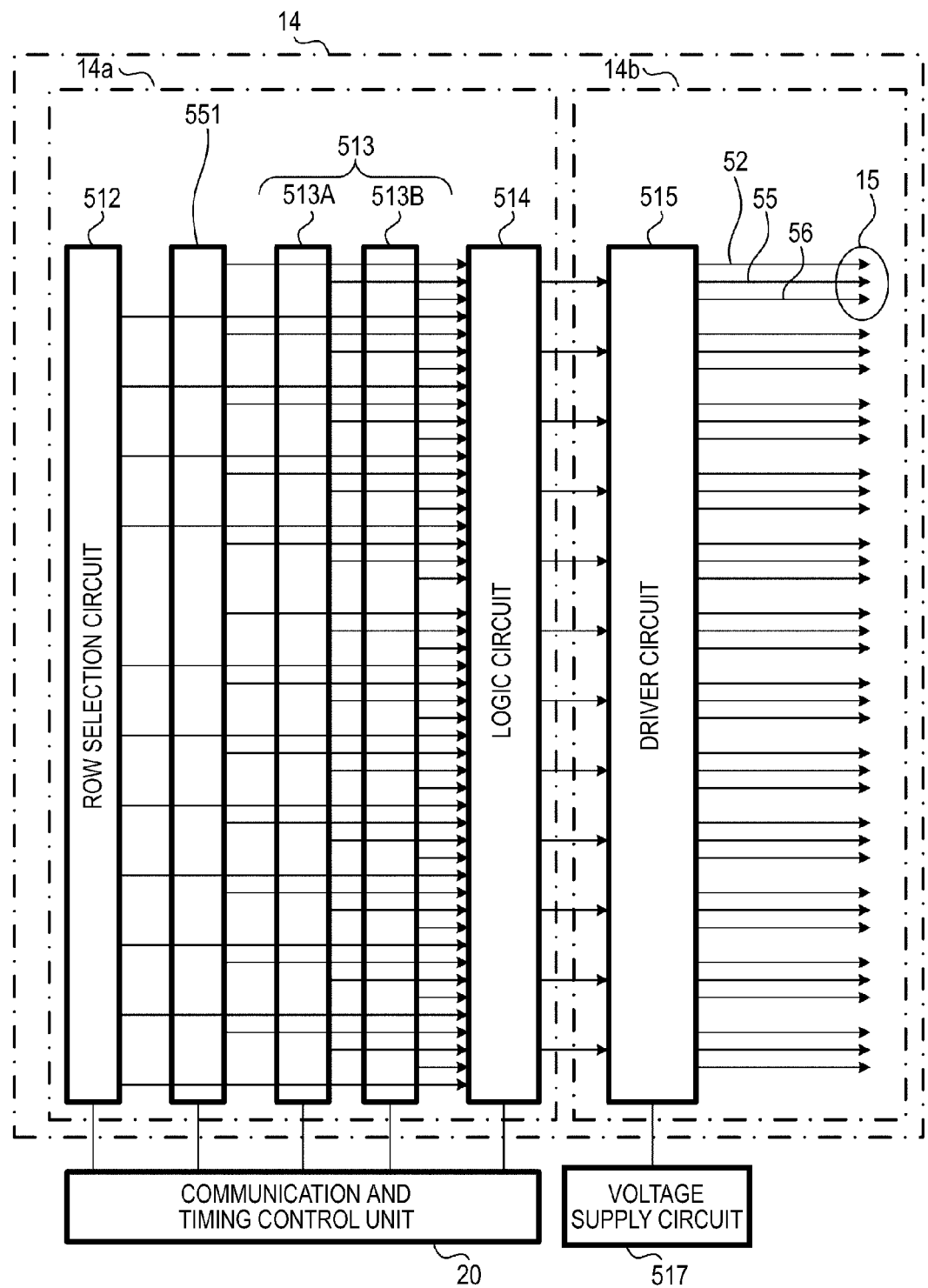
FIG. 14 is a diagram illustrating a third example of a vertical scanning unit.

FIG. 14 is a diagram illustrating a third example of the vertical scanning unit 14. The vertical scanning unit 14 according to the third example is configured to have the preceding selection circuit 513 illustrated in FIG. 12 and the simultaneous multi-row selection circuit 551 illustrated in FIG. 13 in addition to the row selection circuit 512 that performs typical row selection. Other configuration is basically the same as that according to the first example. As described above, by adopting the configuration having both the preceding selection circuit 513 and the simultaneous multi-row selection circuit 551, it becomes possible to switch and execute the focal-plane shutter support driving and the global shutter support driving. Of course, even in the third example, by setting the BM control voltage Vbm and applying the BM shutter, excessive charge can be reduced with respect to an ideal signal, and a high-quality image sensor having a reduced blooming amount can be realized.

Pixel Drive Circuit

First Example

Ternary+No Sharing

FIGS. 15A to 15D are diagrams explaining the configuration example of a transfer drive buffer BF1 for enabling the transfer pulse TR to drive the anti-blooming intermediate voltage Vbm. For reference, FIGS. 15A and 15B show a reset drive buffer BF2 for a pixel reset pulse RS and a row selection drive buffer BF3 for a vertical selection pulse VSEL, which correspond to typical binary driving. FIG. 15C shows a configuration example of a transfer drive buffer BF1, and FIG. 15D is a truth table explaining the operation of the transfer drive buffer BF1. The first example is a configuration example of a case where pixel sharing structure is not taken.

Although not illustrated, to the transfer drive buffer BF1, the reset drive buffer BF2, and the row selection drive buffer BF3, three kinds of voltages, such as a voltage Vcc_H on the positive voltage side, an intermediate voltage (BM control voltage Vbm) for anti-blooming, and a voltage VCC_L on the negative voltage side, and a reference ground voltage (ground=0V) are supplied from a power supply circuit which is installed outside the solid-state imaging device 1 and has sufficiently low output impedance. Typically, the voltage Vcc_H is equal to the power supply voltage Vrd and the power supply voltage Vdd (for example, approximately 3V) on the side of the unit pixel 3, and the voltage Vcc_L is equal to the reference voltage Vss (for example, approximately −1V). In relation to the binary output, the voltage Vcc_H corresponds to H level, and the ground voltage GND corresponds to L level.

As illustrated in FIG. 15A, the reset drive buffer BF2 includes an inverter 330 which performs logical inversion of a reset signal φRS that is generated by the vertical address setting unit 14*a*, and an output buffer 348. To the output buffer 348, the voltage Vcc_H that prescribes H level and the ground voltage GND that prescribes L level are supplied. The output buffer 348, as an example, has a configuration in which a p-channel transistor (p-type transistor) 348H and an n-channel transistor (n-type transistor) 348L are arranged in series between the voltage Vcc_H and the ground voltage GND. The source of the p-type transistor 348H is connected to the voltage Vcc_H, and the source of the n-type transistor 348L is connected to the ground voltage GND. Drains of the p-type transistor 348H and the n-type transistor 348L are commonly connected, and this connection point is connected to an output terminal for the pixel reset pulse RS. Gates of the p-type transistor 348H and the n-type transistor 348L are commonly connected, and an output of the inverter 330 (reset signal φNRST) is supplied to the connection point.

As a whole, the p-type transistor 348H and the n-type transistor 348L are configured as CMOS inverter buffers which output the pixel reset pulse RS for binary driving between the voltage Vcc_H and the ground voltage GND on the basis of the binary reset signal φRS that is supplied from the vertical address setting unit 14*a*. For example, if the reset signal φRS that is supplied from the vertical address setting unit 14*a* is inactive L, the n-type transistor 348L is turned on and the p-type transistor 348H is turned off, and thus the pixel reset pulse RS becomes at L level corresponding to the ground voltage GND. If the reset signal φRS that is supplied from the vertical address setting unit 14*a* is active H, the p-type transistor 348H is turned on and the n-type transistor 348L is turned off, and thus the pixel reset pulse RS becomes at H level corresponding to the voltage Vcc_H.

As illustrated in FIG. 15B, in the same manner as the reset drive buffer BF2, the row selection drive buffer BF3 includes an inverter 350 which performs logical inversion of a vertical selection signal φVSEL that is generated by the vertical address setting unit 14*a*, and an output buffer 368. To the output buffer 368, the voltage Vcc_H that prescribes H level and the ground voltage GND that prescribes L level are supplied. The output buffer 368, as an example, has a configuration in which a p-channel transistor (p-type transistor) 368H and an n-channel transistor (n-type transistor) 368L are arranged in series between the voltage Vcc_H and the ground voltage GND. The source of the p-type transistor 368H is connected to the voltage Vcc_H, and the source of the n-type transistor 368L is connected to the ground voltage GND. Drains of the p-type transistor 368H and the n-type transistor 368L are commonly connected, and this connection point is connected to an output terminal for the vertical selection pulse VSEL. Gates of the p-type transistor 368H and the n-type transistor 368L are commonly connected, and an output of the inverter 350 (vertical selection signal φNVSEL) is supplied to the connection point.

As a whole, the p-type transistor 368H and the n-type transistor 368L are configured as CMOS inverter buffers which output the vertical selection pulse VSEL for binary driving between the voltage Vcc_H and the ground voltage GND on the basis of the binary vertical selection signal φVSEL that is supplied from the vertical address setting unit 14*a*. For example, if the vertical selection signal φVSEL that is supplied from the vertical address setting unit 14*a* is inactive L, the n-type transistor 368L is turned on and the p-type transistor 368H is turned off, and thus the vertical selection pulse VSEL becomes at L level corresponding to the ground voltage GND. Further, if the vertical selection signal φVSEL that is supplied from the vertical address setting unit 14*a* is active H, the p-type transistor 368H is turned on and the n-type transistor 368L is turned off, and thus the vertical selection pulse VSEL becomes at H level corresponding to the voltage Vcc_H.

As illustrated in FIG. 15C, the transfer drive buffer BF1 is configured to be able to generate a transfer pulse TR for ternary driving on the basis of the binary transfer signal φTR and the BM shutter signal φBM supplied from the vertical address setting unit 14*a*. Specifically, the transfer drive buffer BF1 includes a logic circuit 310 and an output buffer 328 that has a similar configuration to the inverter to correspond to the ternary output. To the output buffer 328, three kinds of voltages, such as the voltage Vcc_H on the positive voltage side, the BM control voltage Vbm, and the voltage Vcc_L on the negative voltage side, are supplied. To the logic circuit 310, an active H (High) address signal ADRS that indicates the row selection timing is given from the vertical address setting unit 14*a*, and an active H (High) transfer signal φTR are supplied in the pixel signal readout timing. Further, the BM shutter signal φBM is supplied to the logic circuit 310 in the timing in which the BM control voltage Vbm is applied.

In the configuration of the solid-state imaging device 1 illustrated in FIG. 1, in a state where three kinds of voltages are supplied to the vertical drive unit 14b of the vertical scanning circuit 14, the vertical address setting unit 14a determines the address ADRS of the readout row on the basis of the instruction from the communication and timing control unit 20, and makes the address signal φADRS that indicates the corresponding address ADRS input to the logic circuit 310. At this time, binary (H level and L level) transfer pulse φTR and the BM shutter signal φBM are supplied to the readout selection transistor 34 of the readout row, and in the predetermined timing of one horizontal period (1H) of the time point that corresponds to the shutter operation row and the readout operation row, the readout selection transistor 34 is driven.

The output buffer 328, as an example, includes a p-channel transistor (p-type transistor) and/or an n-channel transistor (n-type transistor). Specifically, two parallel-arranged n-type transistors 328BM and 328L are arranged in series to the p-type transistor 328H. The source of the p-type transistor 328H is connected to the voltage Vcc_H, the source of the n-type transistor 328BM is connected to the BM control voltage Vbm, and the source of the n-type transistor 328L is connected to the voltage Vcc_L. Drains of the p-type transistor 328H, the n-type transistor 328BM, and the n-type transistor 328L are commonly connected, and this connection point is connected to an output terminal for the transfer pulse TR. From the logic circuit 310, an active L (Low) transfer signal TRVD is supplied to the gate of the p-type transistor 328H, an active H (High) transfer signal TRBM is supplied to the gate of the n-type transistor 328BM, and an active H (High) transfer signal TRVS is supplied to the gate of the n-type transistor 328L.

As a whole, the p-type transistor 328H and the n-type transistor 328L are configured as CMOS inverter buffers which output the transfer pulse TR for binary driving between the voltage Vcc_H and the voltage Vcc_L on the basis of the binary transfer signal φTR that is supplied from the vertical address setting unit 14a. For this, on the basis of a certain condition, the n-type transistor 328BM can set the BM control voltage Vbm as the transfer pulse TR. The operation of the logic circuit 310 is as shown in the truth table of FIG. 15D.

The configuration example that corresponds to the ternary driving of the transfer drive buffer BF1 as shown here are merely exemplary, and various modified examples may be adopted. For example, in principle, although the configuration is desirable to faithfully reflect the truth table illustrated in FIG. 15D, the logic circuit 310 may take a bit shifting of the transition timing so that a period, in which respective transistors are commonly turned on, does not occur so as to prevent the occurrence of through-current that is caused by simultaneous turn-on of any two or three transistors of the p-type transistor 328H, the n-type transistor 328BM, and the n-type transistor 328L from the relationship between gate delays.

Modified Example 1

Although the first example shows a case where ternary driving is performed with one BM control voltage Vbm, in the case of increasing the number of BM control voltages Vbm, system may be provided to each n-type transistor 328BM of the BM control voltage Vbm.

Modified Example 2

Although the first example shows a case where ternary driving is performed with one BM control voltage Vbm, anti-blooming effect can be obtained by making the transfer gate in a floating state instead of giving a clear BM control voltage Vbm. As the configuration of the transfer drive buffer BF1 corresponding to this case, for example, the n-type transistor 328BM for setting the BM control voltage Vbm may be removed and a buffer having an inhibit terminal mounted thereon may be installed at the rear end of the output buffer 328. The transfer signal TRBM that has been input to the gate of the n-type transistor 328BM is supplied to the inhibit terminal. When the inhibit terminal (transfer signal TRBM) is at L level, the buffer outputs the input terminal state (that is, output logic of the output buffer) from the output terminal, while when the inhibit terminal is at H level, the buffer makes its output terminal in an open state. Through this, when the BM shutter is applied, the transfer gate may be in a floating state.

Detailed Application Examples

Next, detailed application examples will be described.

Embodiment 1

FIGS. 16A to 16C are diagrams illustrating a pixel driving method according to Embodiment 1. Embodiment 1 is the most fundamental scheme in a case where a transfer gate voltage for anti-blooming is set to the BM control voltage Vbm and is a form where the BM control voltage Vbm is applied once. The electronic shutter may turn on the reset gate (reset transistor 36) after the transfer gate (readout selection transistor 34) is turned on and then is turned off, or may turn on the transfer gate (readout selection transistor 34) and the reset gate (reset transistor 36) together. The figure shows the latter.

As illustrated in FIG. 16A, a voltage at which the charge generation unit 32 can maintain a charge amount (Hs/2) corresponding to half of the saturation charge amount Hs is set as the BM control voltage Vbm. In a non-saturated pixel which does not reach the saturation charge amount Hs at the storage time Ts where incident light is weak, a signal corresponding to a storage charge amount Qs of the corresponding non-saturated pixel can be appropriately read without being influenced by the BM shutter when complete transfer is performed. On the other hand, in a saturated pixel which reaches the saturation charge amount Hs at a storage time Ts/2 where incident light is strong, a blooming amount is reduced by the BM shutter, and a signal corresponding to the saturation charge amount Hs can be read when complete transfer is performed. In addition, when the complete transfer is performed, the CDS process is performed for a reset level which is read by resetting the floating diffusion 38 immediately therebefore.

Here, the timing example shown in FIG. 16B is a form where a signal corresponding to a charge amount discharged to the floating diffusion 38 is not read at the time of the BM shutter. Although, in the example indicated by the solid line in the figure, reset is not performed at the time of the BM shutter, the floating diffusion 38 may be reset by the reset transistor 36 using the reset signal RS of the active H as indicated by the chain line. This reset operation does not cause readout of a signal, and thus may be performed at the same time as the BM shutter (the figure shows this state). On the other hand, the timing example shown in FIG. 16C is a form where a signal corresponding to a charge amount discharged to the floating diffusion 38 is read at the time of the BM shutter. At this time, the CDS process is performed for a reset level which is read by resetting the floating diffusion 38 immediately therebefore. A signal at the time of the BM shutter is read, and thereby it is possible to expand the dynamic range through signal synthesis.

Embodiment 2

FIGS. 17A to 17C are diagrams illustrating a pixel driving method according to Embodiment 2. Embodiment 2 is a form where the BM shutter is applied multiple times, and the BM control voltages Vbm at the time of respective BM shutters are the same as each other. The figures show a case where a voltage at which the charge generation unit 32 can maintain a charge amount (Hs/2) corresponding to half of the saturation charge amount Hs is set to the BM control voltage Vbm, and the BM shutter is applied three times.

As shown in FIG. 17A, in a non-saturated pixel which does not reach the saturation charge amount Hs at the storage time Ts where incident light is weak, a signal corresponding to a storage charge amount Qs of the corresponding non-saturated pixel can be appropriately read without being influenced by the BM shutter when complete transfer is performed. On the other hand, in a saturated pixel which reaches the saturation charge amount Hs at a storage time Ts/4 where incident light is strong, a blooming amount is reduced by the BM shutter, and a signal corresponding to the saturation charge amount Hs can be read when complete transfer is performed. In addition, a time interval between the electronic shutter and the first BM shutter is Ts/4, and a time interval between the first and second BM shutters and between the second and third BM shutters is Ts/8, which have a relationship of 2:1. That is to say, the BM shutter is added twice so as to ensure a shutter period of half of up to the first BM shutter.

Here, the timing example shown in FIG. 17B is a form where a signal corresponding to a charge amount discharged to the floating diffusion 38 is not read at the time of the BM shutter. Although, in the example indicated by the solid line in the figure, reset is not performed at the time of the BM shutter, the floating diffusion 38 may be reset by the reset transistor 36 using the reset signal RS of the active H as indicated by the chain line. Since there is concern that the floating diffusion 38 overflows when the number of times to be discharged to the floating diffusion 38 is large and incident light is strong, the reset is preferably applied. On the other hand, the timing example shown in FIG. 17C is a form where a signal corresponding to a charge amount discharged to the floating diffusion 38 is read at the time of the BM shutter. The signal at the time of the BM shutter is read, and thereby it is possible to further expand the dynamic range in signal synthesis. In addition, the reset operation is accompanied on reading a signal at this time, and thus there is no concern that the floating diffusion 38 overflows.

Embodiment 3

Figure 18:
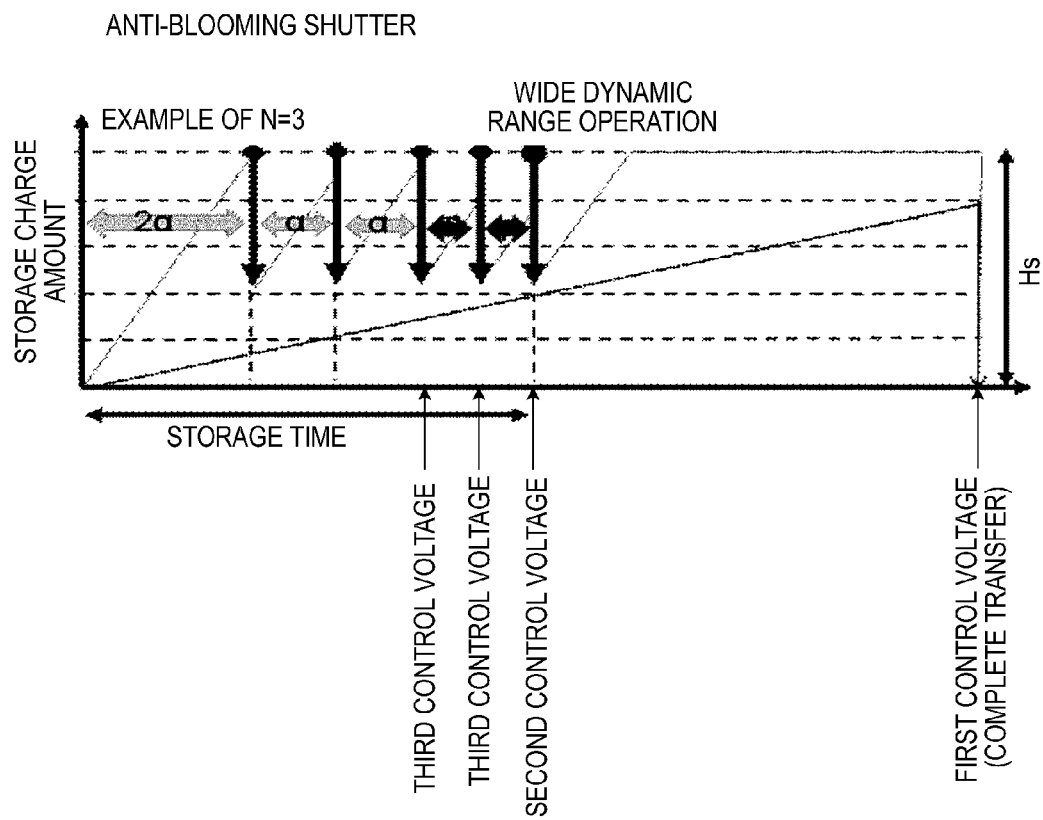
FIG. 18 is a diagram explaining a pixel driving method according to embodiment 3.

FIG. 18 is a diagram illustrating a pixel driving method according to Embodiment 3. Embodiment 3 has a feature in that blooming is reduced by applying the BM shutter in a scheme for expanding the dynamic range using the intermediate voltage readout.

As a scheme for expanding the dynamic range using the intermediate voltage readout, a technique disclosed in JP-A-2008-99158 is used. In the technique disclosed in the same publication, it is possible to acquire data stored for a short time (storage time T) through the intermediate voltage shutter (intermediate shutter using the second control voltage) and the intermediate voltage readout where a signal at that time is read, in order to expand the dynamic range, and it is possible to obtain an image having a wide dynamic range through synthesis with data stored for a long time. In addition, in order to prevent non-uniformity of the intermediate voltage shutter, the intermediate shutter (double shutters where an intermediate shutter using the third control voltage and an intermediate shutter using the second control voltage are used together) ensuring the same time as the storage time is added. The intermediate voltage (second control voltage) which is applied during the intermediate readout operation is preferably the same as the intermediate voltage (third control voltage) which is applied in advance in order to suppress non-uniformity of the threshold value of the readout selection transistor 34 (transfer gate). In addition, for each application of the second control voltage (the term "each" is also used in consideration of a case of plurality), the third control voltage is preferably performed multiple times. Time intervals when the intermediate voltages with the same voltage value are supplied multiple times are preferably the same as each other.

In this technique, if a BM shutter is to be added, the BM shutter is added before an intermediate shutter using the third control voltage. In addition, even if the BM shutter is added as a condition at this time, the BM shutter is added only when an interval equal to or more than the short storage time is ensured between the complete shutter (complete transfer using the first control voltage) and the intermediate shutter (intermediate shutter using the second control voltage or the third control voltage). This is because the BM shutter is prevented from influencing the effect of the intermediate voltage shutter for dynamic range expansion.

An example where the BM shutter is added is shown in FIG. 18. In addition, the figure shows a case where the BM shutter is applied twice (that is, N=3). The second BM shutter is added so as to ensure a shutter period corresponding to half of a period up to an initial shutter of the BM shutter, thereby reducing a blooming amount. The BM shutter is added when a relationship between the interval α of the BM shutters and the storage time T of the short time storage is $\alpha \geq T$, thereby preventing blooming without influencing the effect of the intermediate voltage shutter for the dynamic range expansion. It is possible to realize acquisition of an image which has small blooming and high quality without influencing the intermediate voltage shutter and the signal output for dynamic range expansion through the intermediate readout.

Modified Example of Embodiment 3

Although the second control voltage and the third control voltage are the same as each other in Embodiment 3, this is not essential. The application and the readout of the second control voltage may be performed multiple times. For each application of the second control voltage, the third control voltage may be applied only once. Even if time intervals where intermediate voltages with the same voltage value are supplied multiple times are not the same as each other, it is possible to achieve an effect of suppressing non-uniformity of the threshold value corresponding thereto. The third control voltage may not be applied before the second control voltage is applied. However, in this case, the effect according to the application of the third control voltage may not be achieved.

Embodiment 4

FIG. 19 is a diagram illustrating Embodiment 4. Embodiment 4 is a case where the present disclosure is applied to an imaging apparatus which is an example of the physical information acquiring apparatus. The imaging apparatus is applied to a digital still camera, a video camera or the like, and is very appropriate to be used as an imaging apparatus (image input device) thereof. Here, the imaging apparatus indicates a camera module and a camera system such as a digital still camera or a video camera which has the camera module mounted thereon, the camera module (for example, mounted on an electronic appliance such as a portable telephone and used) including a solid-state imaging device as an imaging apparatus, an optical system which forms image light of a subject on an imaging surface (light sensing surface) of the solid-state imaging device, and a signal processing circuit of the solid-state imaging device, but these are only an example, and the imaging apparatus is not limited to such forms.

The imaging apparatus 600 includes a photographing optical system 602, an optical lowpass filter 604, an imaging unit 610, a driving control unit 620, an imaging signal processing unit 630, a display unit 660, and a data recording unit 690. The photographing optical system 602 is mainly constituted by an imaging lens, and forms an image by guiding light L carrying an image of the subject Z to the imaging unit. The imaging unit 610 includes a color filter group 612 and a solid-state imaging device 614 (image sensor). The driving control unit 620 drives the solid-state imaging device 614.

The subject Z forms an image thereof on the solid-state imaging device 614 through the photographing optical system 602. The solid-state imaging device 614 has a first charge storage unit (detection unit of an visible light band, corresponding to C2, C3, and C4) storing imaged charge and a second charge storage unit (detection unit of an infrared light band corresponding to C1). Therefore, the solid-state imaging device 614 also can acquire a signal according to the infrared light carrying an image of the subject Z.

The solid-state imaging device 614 of the imaging unit 610 is an imaging device including a photoelectric conversion pixel group which is formed in a two-dimensional matrix shape. The solid-state imaging device 614 uses a CCD type (CCD image sensor) instead of a CMOS type. Although, in the above description, the CMOS type solid-state imaging device 1 (CMOS image sensor) has been described, the above-described technology regarding the BM shutter is not limited to the CMOS image sensor and is also applicable to a charge transfer type solid-state imaging device represented by the CCD image sensor since the technology is related to the overall amplification type solid-state imaging devices and readout of signal charge from a photoelectric conversion device.

The figure shows a case where the present disclosure is applied to the CCD type solid-state imaging device 614. In the CCD image sensor, photoelectric conversion is performed in a photodiode 682 (light sensing portion) which is a photoelectric conversion device, and signal charge stored therein is transferred to a vertical CCD 688 (vertical transfer portion) by a transfer gate 684 (readout gate) and is read through vertical transfer by the vertical CCD 688. In the CCD image sensor, the above-described BM control voltage Vbm is applied to the transfer gate 684 as a control voltage, and thereby it is possible to control an electron amount transferred to the vertical CCD 688.

For example, since an amount of electrons undergoing the photoelectric conversion is small when incident light is weak, even if the BM control voltage Vbm is applied to the transfer gate 684, the electrons stored in the photodiode 682 do not exceed the lower potential of the transfer gate 684 and is held in the photodiode 682. On the other hand, since an amount of electrons undergoing the photoelectric conversion is large when incident light is strong, if the BM control voltage Vbm is applied to the transfer gate 684, the electrons stored in the photodiode 682 exceed the lower potential of the transfer gate 684 and can be partially transferred to the vertical CCD 688. In addition, an intermediate voltage shutter (intermediate shutter using the second control voltage) and intermediate voltage readout for reading a signal at that time may be applied thereto. Since an amount of electrons undergoing the photoelectric conversion is large when incident light is strong, if the intermediate voltage (second control voltage) is applied to the transfer gate 684, the electrons stored in the photodiode 682 exceed the lower potential of the transfer gate 684 and can be partially transferred to the vertical CCD 688. Therefore, the intermediate voltage (the third control voltage or the second control voltage) is applied at the same timing as in Embodiment 3 of the case of the CMOS image sensor, and thereby it is possible to acquire a signal through intermediate transfer by applying the intermediate voltage to the transfer gate 684 in high light intensity in a state of maintaining signal charge in low light intensity in the same manner as the case of the CMOS image sensor.

The imaging signal processing unit 630 processes an imaging signal SV (visible light component) output from the solid-state imaging device 614. The optical lowpass filter 604 is used to block a high frequency component equal to or more than the Nyquist frequency in order to prevent aliasing distortion. As denoted by the dotted lines in the figure, an optical filter unit 605 may be provided along with the optical lowpass filter 604 in order to suppress unnecessary components (for example, infrared components of long wavelength side, ultraviolet components of short wavelength side, or the like) other than the visible light component. For example, an infrared light cut filter is typically provided as the optical filter unit 605, and this is the same as in the generic imaging device. The optical filter unit 605 and the color filter group 612 are an example of the optical member which has a filter characteristic for light in the imaging optical system.

Charge according to the infrared light IR or charge according to the visible light VL which carries an image of the subject Z is generated from the imaging surface of the solid-state imaging device 614. An operation such as the charge storage operation or the charge readout operation is controlled by a pulse signal for sensor driving which is output to the driving control unit 620 from a system control circuit (not shown). The charge signals read from the solid-state imaging device 614, that is, the infrared light imaging signal SIR carrying an infrared light image and the visible light imaging signal SVL carrying a visible light image are sent to the imaging signal processing unit 630 and undergo a predetermined signal process. The imaging signal processing unit 630 processes the imaging signal SIR (infrared light component) and the imaging signal SVL (visible light component) output from the solid-state imaging device 614.

An operation such as the charge storage operation or the charge readout operation is controlled by a pulse signal for sensor driving which is output to the driving control unit 620 from a system control circuit (not shown). The charge signal read from the solid-state imaging device 614, that is, the visible light imaging signal SVL carrying a visible light image is sent to the imaging signal processing unit 630 and undergoes a predetermined signal process. For example, the imaging signal processing unit 630 includes a preprocessing portion 632, an AD conversion portion 634, a pixel signal correction processing portion 636, a frame memory 638, an interface portion 639, and an image signal processing portion 640.

The preprocessing portion 632 performs a preprocess such as black level adjustment, gain adjustment, or gamma correction for the sensor output signals (the visible light imaging signal SVL and the infrared light imaging signal SIR) output from the solid-state imaging device 614. The AD conversion portion 634 converts the analog signals output from the preprocessing portion 632 into digital signals. The pixel signal correction processing portion 636 corrects shading occurring in the photographing optical system 602 or pixel defects of the solid-state imaging device 614.

The image signal output from the solid-state imaging device 614 is amplified by the preprocessing portion 632, converted into digital data by the AD conversion portion 634, undergoes correction such as shading by the pixel signal correction processing portion 636, and stored in the frame memory 638. The digital image data in the frame memory 638 is output via the interface portion 639 in response to a request from the image signal processing portion 640.

The image signal processing portion 640 performs a predefined signal process based on information where the subject Z is imaged with different colors and sensitivities for each pixel depending on the arrangement pattern (mosaic pattern) of the color filters C1 to C4. As an example, a subject distance is measured or an object is detected by performing a high sensitivity process for a normal image or an infrared light image, or based on image information derived from light of a specific wavelength component. For example, the time of flight (TOF) is measured using the time-of-flight measuring method by sensing reflection light of light applied to the subject Z, and a distance to the subject Z is measured or a three-dimensional image of the subject Z is obtained based on the time of flight.

The display unit 660 includes a display device, for example, an LCD (Liquid Crystal Display), an organic EL, or the like, and displays an image corresponding to a video signal input from the driving control unit 620. The data recording unit 690 has a CODEC (abbreviation of Code/Decode or Compression/Decompression), records image information supplied from the driving control unit 620 or the display unit 660 in a memory (recording medium) such as a flash memory storing an image signal, reads the image information for decoding, and supplies the decoded information to the driving control unit 620 or the display unit 660.

The imaging apparatus 600 is provided as an electronic appliance for performing the "imaging" such as, for example, a camera or a portable apparatus having the imaging function. The "imaging" includes not only image capturing in photographing using a typical camera but also detection of fingerprints or acquisition of image information using pressure as physical quantity distribution in a physical quantity distribution detection semiconductor device or a physical information acquisition device (physical quantity distribution detection device) such as a touch panel in a wide sense. The above-described BM shutter function is also applied to the imaging apparatus 600 having such a configuration, and thereby it is possible to implement a high image quality sensor where a blooming amount is reduced. By applying Embodiment 3, it is possible to acquire a signal which has small blooming and high image quality without influencing the intermediate shutter and the signal output for dynamic range expansion using the intermediate readout.

Embodiment 5

FIGS. 20A and 20B are diagrams illustrating Embodiment 5. Embodiment 5 is a case where the present disclosure is applied to a linear sensor. Although the description has been made paying attention to the transfer gate in the CMOS type or CCD type solid-state imaging device which is an example of the so-called area sensor in the embodiments, an application range of the BM shutter technology proposed in the present disclosure is not limited thereto.

For example, as shown in FIGS. 20A and 20B, the CCD type solid-state imaging device may be a linear sensor. In the first example shown in FIG. 20A, the charge detection portion is linearly disposed in two lines, in other words, the device portion is provided in two lines. A charge transfer portion is provided for each column, and a transfer register Reg is provided so as to correspond to each charge detection portion of the charge transfer portion for each column. A transfer gate is interposed between the charge transfer portion and the transfer register Reg. The transfer register Reg in the last stage is referred to as a last register LReg. The last register LReg is connected to a floating diffusion FD of the charge-electrical signal conversion portion via the readout gate ROG. In addition, an excessive charge sweeping portion is provided in one column so as to be arranged in parallel to the charge transfer portion, and the excessive charge sweeping portion in one column is commonly used by the charge transfer portions in two columns. Specifically, an overflow barrier is provided for each device portion, and the overflow barriers corresponding to two columns interpose an overflow drain therebetween.

In the second example shown in FIG. 20B, the charge detection portion is linearly disposed in one line, in other words, the device portion is provided in one line. A transfer register Reg is provided so as to correspond to each charge detection portion of the charge transfer portion. The transfer register Reg in the last stage is referred to as a last register LReg. The last register LReg is connected to a floating diffusion FD of the charge-electrical signal conversion portion via the readout gate ROG. In addition, an excessive charge sweeping portion is provided so as to be arranged in parallel to the charge transfer portion.

In both the first example and the second example, it is possible to capture an image which has a small blooming amount and high image quality by applying the above-described BM shutter function to the transfer gate between the charge detection portion and the transfer register Reg, and it is possible to acquire an image which has small blooming and high image quality without influencing the intermediate shutter and the signal output for dynamic range expansion using the intermediate readout.

Embodiment 6

FIGS. 21A to 21D are diagrams illustrating Embodiment 6. Embodiment 6 is a case regarding other electronic appliances which have the imaging apparatus with the above-described BM shutter function mounted thereon.

Figure 21A:
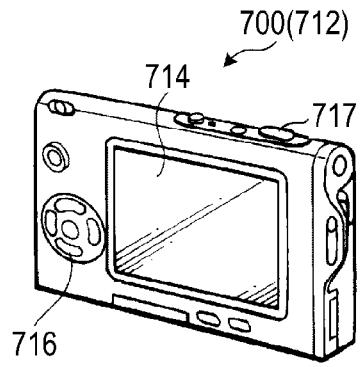
FIGS. 21A to 21D are diagrams explaining embodiment 5.

For example, FIG. 21A is a diagram illustrating an exterior example in a case where the electronic appliance 700 is a digital camera 712. The digital camera 712 includes a display module 714, a control switch 716, a shutter button 717, and others. A solid-state imaging device (not shown) is mounted on the digital camera 712, and it is possible to capture an image which has small blooming and high image quality by applying the above-described BM shutter function of the solid-state imaging device 1 or the imaging apparatus 600 thereto. In addition, it is possible to acquire an image which has small blooming and high image quality without influencing the intermediate shutter and the signal output for dynamic range expansion using the intermediate readout.

Figure 21B:
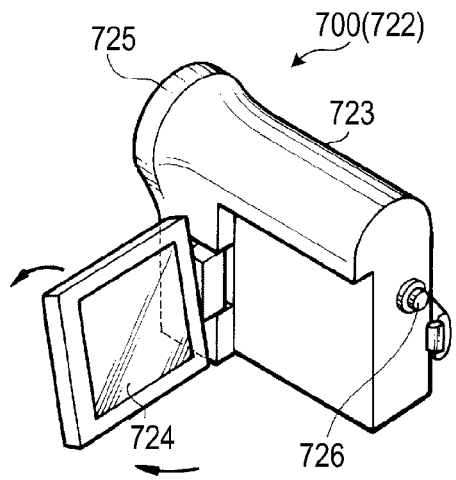

FIG. 21B is a diagram illustrating an exterior example in a case where the electronic appliance 700 is a video camera 722. The video camera 722 has an imaging lens 725 which is provided in front of the main body 723 and images a subject, a display module 724, a photographing start/stop switch 726, and the like. A solid-state imaging device (not shown) is mounted on the video camera 722, and it is possible to capture an image which has small blooming and high image quality by applying the above-described BM shutter function thereto. In addition, it is possible to acquire an image which has small blooming and high image quality without influencing the intermediate shutter and the signal output for dynamic range expansion using the intermediate readout.

Figure 21C:
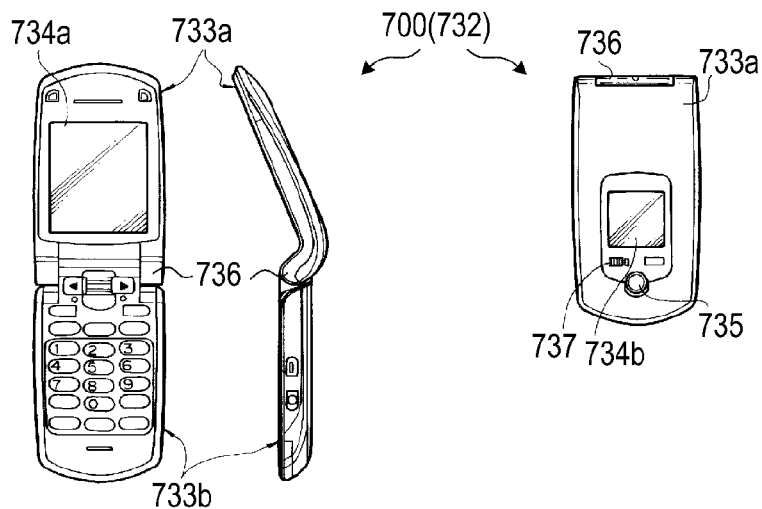

FIG. 21C is a diagram illustrating an exterior example in a case where the electronic appliance 700 is a portable telephone 732. The portable telephone 732 is of a folder type, and includes an upper case 733a, a lower case 733b, a display module 734a, a sub-display 734b, a camera 735, a connection portion 736 (a hinge portion in this example), a picture light 737, and the like. The above-described structure for an RTS noise suppression process or a multiple addition AD conversion process of the solid-state imaging device 1 or the imaging apparatus 8 is applied to the camera 735 of the portable telephone 732. Further, a memory card 738 is attachable to and detachable from the portable telephone 732, and the structure for the RTS noise suppression process of the above-described embodiments is applied to readout of data from the memory card 738.

Figure 21D:
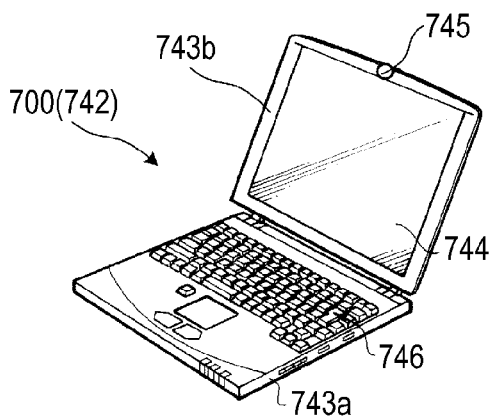

FIG. 21D is a diagram illustrating an exterior example in a case where the electronic appliance 700 is a computer 742. The computer 742 includes a lower case 743a, an upper case 743b, a display module 744, a web camera 745, a keyboard 746, and the like. In addition, it is possible to capture an image which has a small blooming amount and high image quality by applying the above-described BM shutter function to the web camera 745 of the computer 742, and it is possible to acquire an image which has small blooming and high image quality without influencing the intermediate shutter and the signal output for dynamic range expansion using the intermediate readout.

Although the technology disclosed in the present specification has been described with reference to the embodiments, the technical scope of the contents recited in the appended claims is not limited to the scope disclosed in the embodiments. Various modifications or alternatives are added to the embodiments without departing from the spirit of the technology disclosed in the present specification, and such forms to which the modifications or alternatives are added are also included in the technical scope of the technology disclosed in the present specification. The above-described embodiments do not limit technologies related to the appended claims, and all the combinations of the features described in the embodiments are not essential as solving methods of problems targeted by the technology disclosed in the present specification. The above-described embodiments include technologies in the respective steps, and various technologies may be extracted through an appropriate combination of a plurality of constituent requirements. As long as effects corresponding to the problems targeted by the technology disclosed in the present specification can be achieved, even if several constituent requirements are removed from the overall constituent elements shown in the embodiments, the configuration where several constituent requirements are removed may also be extracted as the technology disclosed in the present specification.

For example, in addition to an all-element mode where information for all the unit constituent elements of the device portion (particularly, an element array portion where the unit constituent elements are disposed in a matrix) is necessary, there is used a thinning-out mode where information for the unit constituent elements at a predetermined interval is necessary, or an excision mode where information for the unit constituent elements in a specified area, that is, a mode (referred to as an element selection mode) where information for a part of the unit constituent elements is necessary. In addition, there may be used as a method (so called column reading method) in which the unit constituent elements corresponding to one row are accessed at the same time and a signal is read with the row units when a signal is read from each of the unit constituent elements of the element array portion where the unit constituent elements are arranged in a matrix. A case where the element selection mode and the column reading method are used together is called a column selection mode. For example, a technology relating to the column reading method or the column selection mode is disclosed in JP-A-2001-298748 or JP-A-2007-142738.

In a case where the "element selection mode" is executed, if the unit constituent elements which are not read are not driven, there is concern that charge may be excessively stored, and the blooming phenomenon occurs around the unit constituent elements which are not read. As a countermeasure against the case, the above-described anti-blooming shutter technology may be employed.

The present disclosure contains subject matter related to that disclosed in Japanese Priority Patent Application JP 2011-057724 filed in the Japan Patent Office on Mar. 16, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
    a pixel unit comprising a plurality of pixels,
    at least one of the pixels comprising:
        a photoelectric conversion unit configured to detect a charge that is generated on an incident light;
        a transfer unit configured to transfer the charge detected by the photoelectric conversion unit to a floating diffusion unit; and
        a reset unit configured to reset the charge stored in the floating diffusion unit;
    a supplied voltage control portion configured to transfer a part of the charge detected by the photoelectric conversion unit by supplying at least one first control voltage, wherein
    the reset unit resets the charge stored in the floating diffusion unit on or after inputting the at least one first control voltage to the transfer unit;
    the supplied voltage control portion supplies, to the transfer unit, the at least one first control voltage for suppressing a blooming; and
    when the time taken from a start of charge detection through the photoelectric conversion unit to a stop of the supply of the at least one first control voltage for suppressing the blooming to the transfer unit is Tbm and a charge amount reaches a saturation charge amount Hs of the charge detection unit at a storage time Ts, the supplied voltage control portion sets the at least one first control voltage for suppressing the blooming to a value at which the photoelectric conversion unit can maintain the charge amount of Tbm×Hs/Ts.

2. The imaging device according to claim 1, wherein when the amount of the charge exceeds a saturation charge amount of the photoelectric conversion unit, a part of the charge that is detected by the photoelectric conversion unit is transferred, when the at least one first control voltage for suppressing the blooming is supplied to the transfer unit.

3. The imaging device according to claim 1, wherein the at least one first control voltage for suppressing the blooming is a voltage at which the photoelectric conversion unit can maintain a charge amount that corresponds to a saturation charge amount of the photoelectric conversion unit when the at least one first control voltage for suppressing the blooming is supplied to the transfer unit.

4. The imaging device according to claim 1, wherein the at least one first control voltage for suppressing the blooming is a voltage at which the photoelectric conversion unit can maintain a charge amount that corresponds to the saturation charge amount of the photoelectric conversion unit when the at least one first control voltage for suppressing the blooming is supplied to the transfer unit.

5. The imaging device according to claim 1, wherein the supplied voltage control portion continues a supply of the at least one first control voltage for suppressing the blooming to the transfer unit until a predetermined time from the start of charge detection.

6. The imaging device according to claim 5, wherein the at least one first control voltage for suppressing the blooming is a voltage at which the photoelectric conversion unit can maintain a charge amount that corresponds to a saturation charge amount of the photoelectric conversion unit when the supply of the at least one first control voltage for suppressing the blooming to the transfer unit is stopped.

7. The imaging device according to claim 1, wherein the at least one first control voltage for suppressing the blooming is a voltage at which the photoelectric conversion unit can maintain a charge amount that corresponds to a saturation charge amount of the photoelectric conversion unit when the at least one first control voltage for suppressing the blooming is supplied to the transfer unit.

8. The imaging device according to claim 1, further comprising:
   a first driving unit configured to read the charge stored in the floating diffusion unit in a first charge detection period and to output the readout charge from the pixel unit as a first image signal; and
   a second driving unit driven to read the charge stored in the floating diffusion unit that output the first image signal in proportion to the first charge detection period that is determined by a time interval to drive the transfer unit in the first charge detection period and to output the readout charge from the pixel unit as a second image signal having a different sensitivity than the first image signal.

9. The imaging device according to claim 8, wherein the at least one first control voltage for suppressing the blooming is supplied to the transfer unit in a range in which time for acquiring the second image signal can be ensured between a time point where the at least one first control voltage for suppressing the blooming is supplied and a time point where a first control voltage is supplied.

10. The imaging device according to claim 1, wherein the supplied voltage control portion comprises:
    a first supplied voltage control unit supplying the at least one first control voltage to the transfer unit;
    a second supplied voltage control unit sequentially supplying one or a plurality of second control voltages having a different voltage value from the at least one first control voltage to the transfer unit; and
    a third supplied voltage control unit supplying a third control voltage having the same voltage value as the second control voltages prior to the supply the control voltages.

11. An imaging apparatus comprising:
    a pixel unit comprising a plurality of pixels,
    at least one of the pixels, comprising:
      a photoelectric conversion unit configured to detect a charge that is generated on an incident light;
      a transfer unit configured to transfer the charge detected by the photoelectric conversion unit to a floating diffusion unit; and
      an incident system leading physical information to the photoelectric conversion unit; and
    a supplied voltage control portion configured to transfer a part of the charge detected by the photoelectric conversion unit through supplying of at least one first control voltage, wherein
    a reset unit resets the charge stored in the floating diffusion unit on or after inputting the at least one first control voltage to the transfer unit,
    the supplied voltage control portion supplies, to the transfer unit, the at least one first control voltage for suppressing a blooming; and
    when the time taken from a start of charge detection through the photoelectric conversion unit to a stop of the supply of the at least one first control voltage for suppressing the blooming to the transfer unit is Tbm and a charge amount reaches a saturation charge amount Hs of the charge detection unit at a storage time Ts, the supplied voltage control portion sets the at least one first control voltage for suppressing the blooming to a value at which the photoelectric conversion unit can maintain a charge amount of Tbm×Hs/Ts.

12. An electronic appliance comprising:
    a pixel unit comprising a plurality of pixels,
    at least one of the pixels, comprising:
      a photoelectric conversion unit configured to detect a charge that is generated on an incident light;
      a transfer unit configured to transfer the charge detected by the photoelectric conversion unit to a floating diffusion unit; and
    a supplied voltage control portion configured to transfer a part of the charge detected by the photoelectric conversion unit through supplying of at least one first control voltage; and
    a signal processing portion processing a signal on the basis of the charge detected by the pixel unit, wherein
    a reset unit resets the charge stored in the floating diffusion unit on or after inputting the at least one first control voltage to the transfer unit;
    when the time taken from a start of charge detection through the photoelectric conversion unit to a stop of the supplied voltage control portion supplies, to the transfer unit, the at least one first control voltage for suppressing a blooming; and
    the supply of the at least one first control voltage for suppressing the blooming to the transfer unit is Tbm and a charge amount reaches a saturation charge amount Hs of a charge detection unit at a storage time Ts, the supplied voltage control portion sets the at least one first control voltage for suppressing the blooming to a value at which the photoelectric conversion unit can maintain a charge amount of Tbm×Hs/Ts.

13. A method of driving an imaging device having a pixel unit comprising a plurality of pixels, at least one of the pixels, comprising: a photoelectric conversion unit configured to detect a charge that is generated on an incident light and a transfer unit configured to transfer the charge detected by the photoelectric conversion unit to a floating diffusion unit, the method comprising:

transferring a part of the charge detected by the photoelectric conversion unit by supplying of at least one first control voltage;
transferring the charge detected by the photoelectric conversion unit through supplying of a first control voltage that is different from the at least one first control voltage for suppressing a blooming to the transfer unit, wherein
a reset unit resets the charge stored in the floating diffusion unit on or after inputting the at least one first control voltage to the transfer unit;
when the time taken from a start of charge detection through the photoelectric conversion unit to a stop of the supply of the at least one first control voltage for suppressing the blooming to the transfer unit is Tbm and a charge amount reaches a saturation charge amount Hs of the charge detection unit at a storage time Ts, the supplied voltage control portion sets the at least one first control voltage for suppressing the blooming to a value at which the photoelectric conversion unit can maintain a charge amount of Tbm×Hs/Ts.

\* \* \* \* \*